United States Patent
Peter et al.

(10) Patent No.: US 9,660,898 B2
(45) Date of Patent: May 23, 2017

(54) ENHANCED PROTOCOL INDEPENDENT MULTICAST SOURCE REGISTRATION OVER A RELIABLE TRANSPORT

(71) Applicant: Juniper Networks, Inc., Sunnyvale, CA (US)

(72) Inventors: Anish Peter, Bangalore (IN); Robert W. Kebler, Newburyport, MA (US); Jayakumar Ramalingam, Bangalore (IN); Vikram Nagarajan, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 162 days.

(21) Appl. No.: 14/576,830

(22) Filed: Dec. 19, 2014

(65) Prior Publication Data

US 2016/0182358 A1 Jun. 23, 2016

(51) Int. Cl.
| | |
|---|---|
| *H04L 12/761* | (2013.01) |
| *H04L 12/18* | (2006.01) |
| *H04L 29/12* | (2006.01) |
| *H04L 12/741* | (2013.01) |
| *H04L 12/751* | (2013.01) |

(52) U.S. Cl.
CPC .............. *H04L 45/16* (2013.01); *H04L 12/18* (2013.01); *H04L 12/185* (2013.01); *H04L 45/74* (2013.01); *H04L 61/1535* (2013.01); *H04L 45/026* (2013.01)

(58) Field of Classification Search
None
See application file for complete search history.

(56) References Cited

U.S. PATENT DOCUMENTS

| | | | | |
|---|---|---|---|---|
| 2007/0211735 | A1* | 9/2007 | Williamson | .......... H04L 12/185 370/401 |
| 2010/0054245 | A1 | 3/2010 | Asati et al. | |
| 2010/0303072 | A1* | 12/2010 | Jokela | ................... H04L 12/185 370/390 |

(Continued)

OTHER PUBLICATIONS

Serbest et al., "Supporting IP Multicast over VPLS," Internet Draft, Internet Engineering Task Force, Jul. 1, 2005, 47 pp.

(Continued)

*Primary Examiner* — Gary Mui
(74) *Attorney, Agent, or Firm* — Shumaker & Sieffert, P.A.

(57) ABSTRACT

In one example, a method includes exchanging, by a first routing device and with a second routing device, targeted hello messages using a Protocol Independent Multicast (PIM) protocol to establish a targeted neighbor connection between the first routing device and the second routing device, wherein the first routing device exchanges the targeted hello messages with the second routing device via at least one intermediate routing device, and wherein at least one of the first or second routing device comprises a rendezvous point (RP). The example method further includes processing, by the first routing device using the targeted neighbor connection, a register message that includes multicast stream data elements, wherein each multicast stream data element identifies a source address and a group address that are collectively associated with a respective multicast stream, and wherein each multicast stream data element further indicates whether the respective multicast stream is active or withdrawn.

32 Claims, 8 Drawing Sheets

(56) References Cited

U.S. PATENT DOCUMENTS

| | | | | |
|---|---|---|---|---|
| 2011/0228770 | A1* | 9/2011 | Dholakia | H04L 45/586 370/390 |
| 2011/0286450 | A1* | 11/2011 | Wijnands | H04L 45/04 370/390 |
| 2014/0269412 | A1* | 9/2014 | Venaas | H04L 45/16 370/254 |

OTHER PUBLICATIONS

Macker, Simplified Multicast Forwarding, RFC 6621, Internet Engineering Task Force, May 18, 2012, 55 pp.

Sarikaya et al., "Multicast Support for Mapping of Address and Port Protocol and Light Weight 4over6," Internet Draft, Network Working Group, Sep. 29, 2014, 25 pp.

Extended Search Report from counterpart European Application No. 15187317.1, dated May 20, 2016, 13 pp.

Farinacci et al, "A Reliable Transport Mechanism for PIM," Internet Engineering Task Force, RFC 6559, Mar. 2012, 29 pp.

Fenner et al., "Protocol Independent Multicast—Sparse Mode (PIM-SM): Protocol Specification (Revised)," Network Working Group, RFC 4601, Aug. 2006, 112 pp.

Wijnands et al., "PIM flooding mechanism and source discovery," Network Working Group, draft-ietf-pim-source-discovery-bsr-01, Jul. 3, 2014, 10 pp.

Aggarwal et al. "BGP Encodings and Procedures for Multicast in MPLS/BGP IP VPNs" Internet Engineering Task Force (IETF), RFC 6514, Feb. 2012, 59 pgs.

Aggarwal et al. "IPv4 and IPv6 Infrastructure Addresses in BGP Updates for Multicast VPN" Internet Engineering Task Force (IETF), RFC 6515, Feb. 2012, 8 pgs.

Peter et al. "PIM Source Discovery in Last-Hop-Router" draft-anish-pim-stream-discovery-00, Protocol Independent Multicast (pim), Internet Draft, Mar. 9, 2015, 11 pgs.

Peter et al. "Reliable Transport for PIM Register States" draft-anish-reliable-pim-registers-00, Protocol Independent Multicast (pim), Internet Draft, Mar. 9, 2015, 19 pgs.

Wijnands et al. "Multicast using Bit Index Explicit Replication" draft-wijnands-bier-architecture-04, Internet Engineering Task Force, Internet-Draft, Feb. 2, 2015, 30 pgs.

Office Action from U.S. Appl. No. 14/728,021, dated Dec. 1, 2016, 25 pp.

Response to Extended Search Report dated May 20, 2016, from counterpart European Application No. 15187317.1, filed Dec. 22, 2016, 5 pp.

Response to Office Action dated Dec. 1, 2016, from U.S. Appl. No. 14/728,021, filed on Mar. 1, 2017, 18 pp.

* cited by examiner

TARGETED HELLO MESSAGE TLV

| TYPE 300 || LENGTH 302 ||
|---|---|---|---|
| F 304 | R 306 | RESERVED 308 | EXP 310 |

FIG. 6

ENHANCED PROTOCOL INDEPENDENT MULTICAST SOURCE REGISTRATION OVER A RELIABLE TRANSPORT

TECHNICAL FIELD

This disclosure relates to computer networks, and, more particularly, to transmission of multicast stream data over such networks.

BACKGROUND

A computer network is a collection of interconnected computing devices that exchange data and share resources. In a packet-based network, the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPN's), local area network (LAN's), virtual LANs (VLAN's) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. As an example, the computer network may utilize Protocol Independent Multicast (PIM) as a multicast routing protocol to build distribution trees through the computer network to transport multicast traffic from sources to receivers or subscriber devices for particular multicast groups. PIM may operate in several different modes, including Dense Mode (DM), Sparse Mode (SM), Source-Specific Mode (SSM), and Bidirectional Mode (BIDIR). PIM SM may also support Any-Source Multicast (ASM) mode.

SUMMARY

In one example, a method includes exchanging, by a first routing device and with a second routing device, a plurality of targeted hello messages using a Protocol Independent Multicast (PIM) protocol to establish a targeted neighbor connection between the first routing device and the second routing device, wherein the first routing device exchanges the plurality of targeted hello messages with the second routing device via at least one intermediate routing device, and wherein at least one of the first routing device or the second routing device comprises a rendezvous point (RP). The example method further includes processing, by the first routing device using the targeted neighbor connection with the second routing device, a register message that includes a plurality of multicast stream data elements, wherein each multicast stream data element identifies a source address and a group address that are collectively associated with a respective multicast stream, and wherein each multicast stream data element further indicates whether the respective multicast stream is active or withdrawn.

In one example, a first routing device includes at least one processor. The at least one processor is configured to exchange, with a second routing device, a plurality of targeted hello messages using a Protocol Independent Multicast (PIM) protocol to establish a targeted neighbor connection between the first routing device and the second routing device, wherein the first routing device exchanges the plurality of targeted hello messages with the second routing device via at least one intermediate routing device, and wherein at least one of the first routing device or the second routing device comprises a rendezvous point (RP). The at least one processor is further configured to process, using the targeted neighbor connection with the second routing device, a register message that includes a plurality of multicast stream data elements, wherein each multicast stream data element identifies a source address and a group address that are collectively associated with a respective multicast stream, and wherein each multicast stream data element further indicates whether the respective multicast stream is active or withdrawn.

In one example, a computer-readable storage medium includes instructions that, when executed, cause at least one processor of a first routing device to perform operations. The operations include exchanging, with a second routing device, a plurality of targeted hello messages using a Protocol Independent Multicast (PIM) protocol to establish a targeted neighbor connection between the first routing device and the second routing device, wherein the first routing device exchanges the plurality of targeted hello messages with the second routing device via at least one intermediate routing device, and wherein at least one of the first routing device or the second routing device comprises a rendezvous point (RP). The operations further include processing, using the targeted neighbor connection with the second routing device, a register message that includes a plurality of multicast stream data elements, wherein each multicast stream data element identifies a source address and a group address that are collectively associated with a respective multicast stream, and wherein each multicast stream data element further indicates whether the respective multicast stream is active or withdrawn.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 6 is a conceptual diagram illustrating an example representation of a targeted hello message.

DETAILED DESCRIPTION

Figure 1:
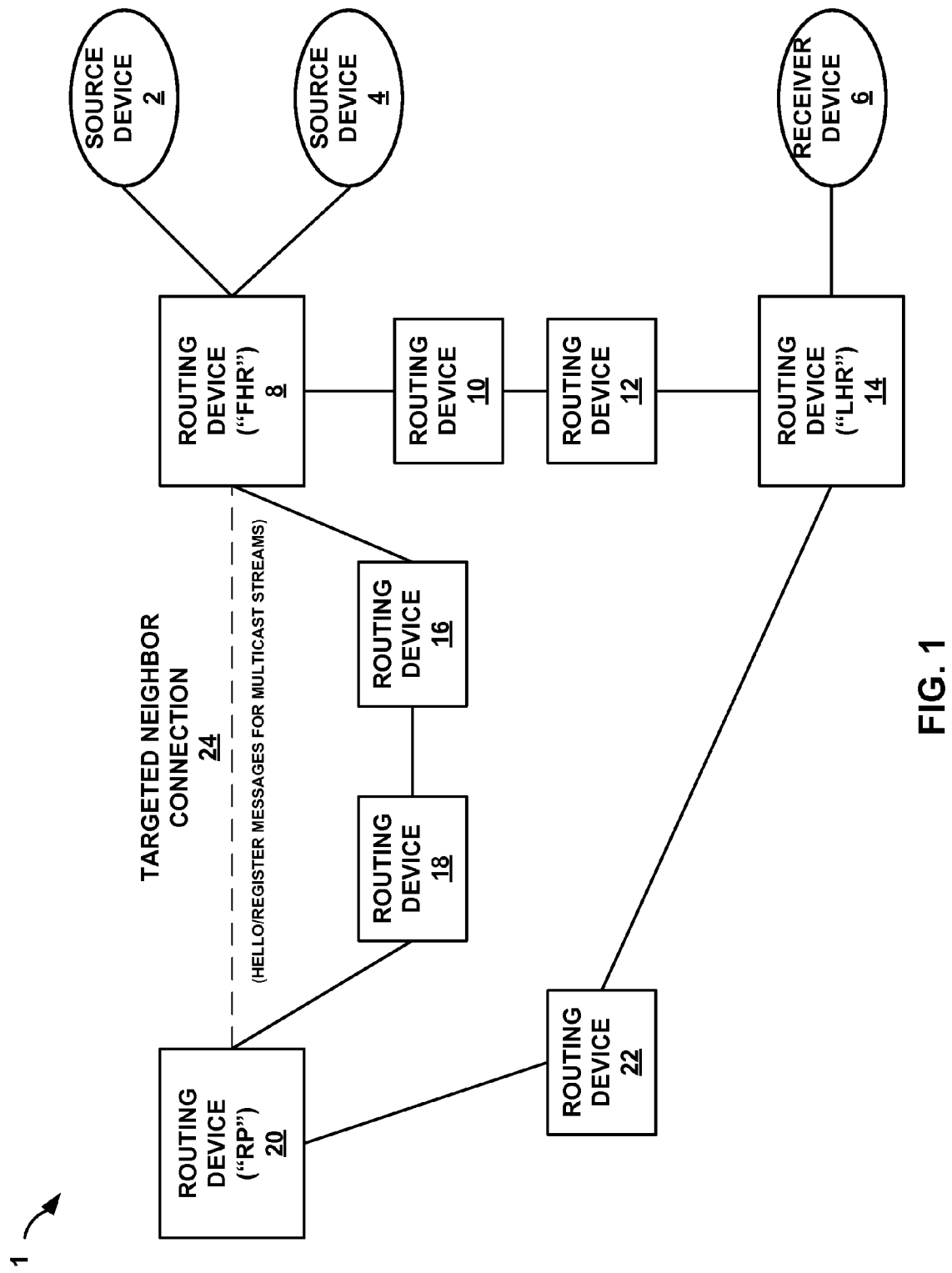
FIG. 1 is a block diagram illustrating an example network comprising multiple routing devices in which one such device, a rendezvous point (RP) and another such device, a First Hop Router (FHR), establish a targeted neighbor connection.

The techniques of the present disclosure provide a reliable targeted neighbor connection between a first routing device, such as a Rendezvous Point (RP), and a second routing device, such as a First Hop Router (FHR), through the exchange of periodic targeted hello messages using Protocol Independent Multicast (PIM), which may, in some instances, provide capability negotiation and discovery between the routing devices. These routing devices may be separated by one or more other intermediary routing devices, and therefore may be multiple hops away from each other. In one example, the techniques extend the concepts of Internet Engineering Task Force RFC 6559 ("A Reliable Transport Mechanism for PIM," Farinacci et al., March 2012, hereinafter "RFC 6559"), the entire content of which is incorporated herein by reference, to allow PIM registration state information to be sent over a reliable transport connection (e.g., targeted neighbor connection), which may potentially provide more scalability for certain multicast services like customer multicast, Internet-protocol television (IPTV), content replication between data centers, and the like.

As one example, after sending an initial targeted hello message to the RP, the FHR listens for the RP to connect to the primary address of the FHR. Once the RP connects to the FHR, a targeted neighbor connection, which may comprise a reliable transport connection, is established between the two devices, where, in some cases, the FHR may have the active role, while the RP may have the passive role. The reliable connection may, in some instances, be maintained with keep-alive messages, as outlined in RFC 6559.

Once this reliable connection is established, the FHR may start sending, to the RP, the source and group addresses of multicast streams that are active with the FHR. When any of these streams are later withdrawn, the FHR sends an update message to the RP to provide the source and group addresses associated with the streams that have been withdrawn. In this way, after a targeted neighbor connection is established between the FHR and the RP, the FHR is capable of updating the RP with its existing and active multicast streams. Subsequently, the FHR sends incremental updates about any changes to the status of these streams to the RP. In various examples, the messages sent by the FHR to the RP via the reliable connection may be referred to as reliable register messages. The implementation of register messages will be described in further detail below.

The implementation of these techniques may, in some cases, provide a hard-state, reliable transport mechanism to supplement and/or replace the use of existing register messages in PIM Sparse Mode (SM) and potentially eliminate the need for the usage of register-stop or null-register messages between the RP and the FHR. In some examples, multiple different RP's that share the same anycast address may exchange targeted hello messages to establish a full mesh of targeted neighbor connections between these RP's. In addition, in certain examples, as will be described in further detail below, the techniques allow a FHR to discover the primary address of an RP operating in an Any Source Multicast (ASM) mode through the exchange of targeted hello messages.

FIG. 1 is a block diagram illustrating an example network 1 comprising multiple routing devices 8, 10, 12, 14, 16, 18, 20, and 22 in which one such device, rendezvous point (RP) 20, and another such device, First Hop Router (FHR) 8, establish a targeted neighbor connection 24, which may comprise a reliable transport connection. Routing devices 8, 10, 12, 14, 16, 18, 20, and 22 are each configured to route multicast traffic between a source device and a receiver device and may comprise edge routers and/or core routers. Two example source devices 2, 4 and one example receiver device 6 are illustrated in FIG. 1, although, in other examples, any number of source devices, receiver devices, and routing devices may be included in network 1. Examples of multicast traffic may include content for Internet Protocol Television (IPTV), desktop conferences, corporate broadcasts, music and video web casts, and other forms of multimedia content.

Source devices 2, 4 are communicatively coupled to routing device 8, and therefore routing device 8 is referred to as FHR 8 in this example. Receiver device 6 is communicatively coupled to routing device 14, and therefore routing device 14 is referred to as a Last Hop Receiver (LHR) in this example. Routing device 20 is configured to operate as a rendezvous point and is therefore referred to as RP 20. Although only one FHR 8 and one LHR 14 are shown in FIG. 1, in other examples, any number of FHR's and LHR's may be communicatively coupled to RP 20 via one or more intermediary routing devices, such as routing devices 10, 12, 16, 18, and 22. Similarly, although only one RP 20 is shown in FIG. 1, in other examples, any number of RP's may be included in network 1 and communicatively coupled to FHR 8 and LHR 14. In some examples, one or more other RP's in network 1 may share an anycast address with RP 20.

Network 1 may be an enterprise network, a campus network, a service provider network, a home network, or another autonomous system. In any of these examples, source devices 2, 4 and receiver 6 may share data via network 1. In one example of network 1 as an enterprise network, each of source devices 2, 4 and receiver device 6 may comprise one or more servers or employee computer terminals located in different regions of a single office location. In another example of network 1 as an enterprise network, each of source devices 2, 4 and receiver device 6 may comprise a remote office location of a corporation such that enterprise network 1 may be extended across a public network, such as the Internet. Additionally, however, the techniques of this disclosure are applicable to other network types, both public and private. Examples of other network types include local area networks (LAN's), virtual local area networks (VLAN's), virtual private networks (VPN's), and the like. In some examples, network 1 may be coupled to one or more additional private or public networks, e.g., the Internet. In other examples, network 1 may comprise the Internet or another public network. In some cases, network 1 may comprise a multi-protocol label switching (MPLS) network.

Network 1 may utilize PIM as a multicast routing protocol to build distribution trees through network 1 to transport multicast traffic from sources 2, 4 to receiver 6 for particular multicast groups. PIM may operate in several different modes, such as Sparse Mode (SM), which may also support Any-Source Multicast (ASM). RP 20 is a routing device toward which multicast traffic from source devices 2, 4 and receiver devices 6 rendezvous. RP 20 is used as a shared of a distribution tree for a range of multicast groups. In the illustrated example, RP 20, FHR 8, LHR 14, and routing devices 10, 12, 16, 18, and 22 carry multicast traffic through computer network 1 via a shared tree from source devices 2, 4 to receiver device 6. This shared tree may include one or more paths that transport multicast traffic upstream, e.g., from source devices 2, 4 via FHR 8 towards RP 20, as well as downstream, e.g., away from RP 20 towards receiver device 6 via LHR 14.

Receiver device 6 may subscribe to one or more multicast groups to receive multicast traffic. RP 20 may learn and store source addresses associated with source devices (e.g., source devices 2, 4) for a certain range of multicast groups to which receiver device 6 belongs. RP 20, FHR 8, LHR 14, and routing devices 10, 12, 16, 18, and 22 communicate using PIM control messages, including join requests and prune requests, to propagate requests to join or leave a multicast group from receivers (e.g., receiver device 6) upstream toward the source (e.g., source device 2, 4) of the multicast traffic.

As an example, when LHR 14 detects that receiver device 6 is to receive traffic for a particular multicast group, LHR 14 may send a (*, G) join control message towards RP 20. More specifically, LHR 14 may determine an address of RP 20, which is responsible for the multicast group range that includes the particular multicast group. LHR 14 sends a (*, G) join control message because LHR 14 does not know the source of the multicast group. When an upstream routing device, e.g., routing device 22, receives the (*, G) join control message, routing device 22 forwards the join control message further upstream towards RP 20. In addition, (*, G) multicast tree state is instantiated in each routing device, e.g., routing device 22, that the (*, G) join control message passes through on the way to RP 20. According to this process, routing devices may conceptually build a shared tree across network 1. Upon receipt, RP 20 processes the (*, G) join control message and may begin sending multicast traffic for the multicast group to LHR 14 upon its availability. LHR 14 provides the received multicast traffic to receiver device 6.

As one example, PIM SM typically uses group state to natively forward multicast traffic for a multicast group from source devices 2, 4 toward RP 20 for distribution to all devices in the shared tree that belong to the multicast group. For example, FHR 8 may forward multicast traffic upstream from source device 2, 4 toward RP 20 via routing devices 16, 18. RP 20, in turn, forwards the multicast traffic downstream to routing device 22 and LHR 14, which have state for the multicast group, and towards receiver device 6.

In conventional PIM SM, FHR 8 may tunnel multicast traffic from source devices 2, 4 to RP 20 as control-plane payload traffic using PIM register mechanisms. Initially, the multicast traffic may comprise unicast-encapsulated data packets referred to as PIM register messages, but after RP 20 has initiated source-specific joins towards source devices 2, 4 to instantiate (S, G) multicast tree state in routing devices 16, 18, source devices 2, 4 eventually begin natively forwarding non-encapsulated data packets to RP 20 via FHR 8. To avoid processing two copies of individual data packets (e.g., encapsulated and non-encapsulated copies), RP 20 may send register-stop messages to FHR 8 to prevent FHR 8 from unnecessarily sending the unicast-encapsulated data packets to RP 20. Upon receiving a register-stop message, FHR 8 may start a register-stop timer to maintain this state, and just before the timer expires, FHR 8 sends a null-register message to RP 20 to allow RP 20 to refresh the register-stop information at FHR 8.

This conventional approach, however, may have certain drawbacks. PIM register messages typically are not handled isolated in the data-plane alone or in the control-plane alone, as both functions are usually involved in the register mechanism. Additionally, register messages, register-stop messages, and null-register messages conventionally support carrying only the information about a single (S, G) stream. Thus, as one example, in a standard Ethernet frame, there may be information for a large number of (S, G) streams, and the conventional approach may cause RP 20 to send a large volume of register-stop messages, as well as cause FHR 8 to send an equally large volume of null-register messages to RP 20. In addition, PIM register states are conventionally maintained as soft states that require constant refreshes (e.g., once every sixty seconds) from FHR 8. This constant refresh can result in a large amount of unnecessary communication between FHR 8 and RP 20, particularly if RP 20 serves a large number of streams.

Furthermore, as noted above, FHR 8 may utilize a register-stop timer (e.g., timer value of five seconds from the time FHR 8 sends a null-register message to RP 20). If a register-stop message from RP 20 gets lost or delayed, and the register-stop timer expires, FHR 8 may begin forwarding encapsulated data packets to RP 20 as control-plane messages, which may not be desirable. In addition, the conventional PIM register mechanism may have certain potential security issues, as data register messages are sent as unicast messages from FHR 8 to RP 20.

The techniques of the present disclosure introduce the concept of a targeted neighbor connection, which may comprise a reliable transport connection, between a first routing device, such as RP 20, and a second routing device, such as FHR 8, with an improved message format (e.g., type-length-value, or TLV, based message format) through the implementation of targeted hello messages. These routing devices may be separated by one or more other intermediary routing devices, and therefore may be multiple hops away from each other. For example, RP 20 and FHR 8 may be separated by one or more routing devices, such as routing devices 16 and 18 shown in FIG. 1. In one example, the techniques allow multicast stream state information to be sent over such a targeted neighbor connection, which may provide more scalability for certain multicast services like customer multicast, Internet-protocol television (IPTV), content replication between data centers, and the like.

As shown in FIG. 1, a first routing device (e.g., RP 20) may exchange, with a second routing device (e.g., FHR 8) in network 1, targeted hello messages using a PIM protocol to establish a targeted neighbor connection 24 between the first routing device and the second routing device, where the first routing device exchanges the targeted hello messages with the second routing device via at least one intermediate routing device (e.g., routing devices 16, 18), and where at least one of the first routing device or the second routing device comprises a rendezvous point (RP). These targeted hello messages may be similar to PIM hello messages defined in Network Working Group RFC 4601 ("Protocol Independent Multicast—Sparse Mode (PIM-SM): Protocol Specification (Revised)," Fenner et al., August 2006, hereinafter "RFC 4601"), the entire content of which is incorporated herein by reference. The targeted hello messages of the present disclosure, however, are not confined to the link level, but instead exist at an interface level and have a unicast address as the destination address and traverse multiple hops using unicast routing (e.g., via routing device 16, 18) to reach a targeted hello neighbor (e.g., RP 20 or FHR 8) identified by the destination address. The time-to-live value of these targeted hello messages may, in some cases, be set to a system default time-to-live value.

As will be described in further detail below, the first routing device may use targeted neighbor connection 24 to process a register message that includes multiple multicast stream data elements. Each multicast stream data element identifies a source address and a group address that are collectively associated with a respective multicast stream, and each multicast stream data element further indicates whether the respective multicast stream is active or withdrawn.

For example, RP 20 may receive, from FHR 8, a first targeted hello message comprising a first unicast message that is addressed to a unicast address of RP 20 (e.g., any anycast address or a primary address of RP 20). In response to receiving the first targeted hello message, RP 20 sends, to FHR 8, a second targeted hello message to acknowledge receipt of the first targeted hello message. This second targeted hello message comprises a second unicast message that is addressed to a primary unicast address of FHR 8. The exchange of these targeted hello messages establishes targeted neighbor connection 24 between RP 20 and FHR 8, where FHR 8 may, in some cases, have the active role, and RP 20 may have the passive role. In some examples, targeted neighbor connection 24 may comprise a reliable transport connection (e.g., Transmission Control Protocol (TCP) or Stream Control Transmission (SCTP) protocol connection), as described in RFC 6559, cited above. The reliable transport mechanism, in some cases, can use either TCP or SCTP as the transport protocol.

FHR 8 and RP 20 may also periodically "refresh" these targeted hello messages with one another, based on a refresh timer, to verify the continued presence of the targeted neighborship between FHR 8 and RP 20, as described in more detail below.

Once targeted neighbor connection 24 has been established, FHR 8 may send one or more register messages for multicast streams to RP 20 using targeted neighbor connection 24. As noted above, and as will be described in more detail in reference to FIG. 2, these register messages include multiple multicast stream data elements that each identify a source address and a group address that are collectively associated with a respective multicast stream. These register messages indicate, to RP 20, which multicast streams are active with FHR 8 and which streams have been withdrawn. Once targeted neighbor connection 24 has been established, FHR 8 is capable of sending a given register message to RP 20 indicating an entire list of one or more streams that are active with FHR 8, and an entire list of one or more streams that are withdrawn from FHR 8. In various examples, all of the various register messages are sent by FHR 8 to RP 20 via targeted neighbor connection 24, which may comprise a reliable transport connection using TCP or SCTP (as non-limiting examples) for the transport protocol. Furthermore, in some cases, the reliable transport mechanism of targeted neighbor connection 24 may handle the re-transmission of any register messages from FHR 8 to RP 20, if needed (e.g., if any register messages are lost or corrupted during initial transmission from FHR 8).

For example, if a set of multicast streams have become active with FHR 8, FHR 8 sends a register message to RP 20 with source and group addresses of these active streams, such that RP 20 is able to update its state information for these active streams serviced by FHR 8. The state information maintained by RP 20 identifies a respective source address and group address for each active multicast stream. Subsequently, if any of these streams are withdrawn at FHR 8, FHR 8 sends an update register message to RP 20 indicating the source and group addresses of the streams that have been withdrawn. Upon receiving this updated message, RP 20 updates its state information (e.g., deletes the source and group addresses for the withdrawn streams from the state information). In this way, once targeted neighbor connection 24 is established, FHR 8 is capable of continuously updating RP 20 with its existing and active multicast streams, as well as any streams that have been withdrawn.

As will also be described in further detail below in reference to FIG. 4, in some examples, multiple different RP's that share a same anycast address may exchange targeted hello messages to establish a full mesh targeted neighbor connections between these RP's. In addition, in certain examples, the techniques of the present disclosure allow a FHR (e.g., FHR 8) to discover the primary address of an RP (e.g., RP 20) operating in Any-Source Multicast (ASM) mode through the exchange of targeted hello messages.

The implementation of these techniques may, in some cases, provide a hard-state, reliable transport mechanism to supplement or even replace the use of conventional PIM SM register messages, register-stop messages, and/or null-register messages between RP 20 and FHR 8. Instead, FHR 8 is configured to send register messages to RP 20 that each includes source and group address information for multiple multicast streams. The use of such messages may significantly reduce the volume of register messages between FHR 8 and RP 20, as FHR 8 takes the active role in the communication of such messages, and only sends RP 20 new register messages in order to provide incremental updates about the status of individual streams (e.g., when certain streams have become active or withdrawn). However, as noted above, each individual register message may include source and group address information for multiple different streams.

With such an approach, in certain examples, FHR 8 may avoid sending unicast-encapsulated multicast traffic data to RP 20, reducing the processing overhead and burden on RP 20 when routing such traffic to receivers (e.g., receiver device 6) in network 1. As a result, in various examples, the reliable transport mechanism may provide a form of congestion control to potentially avoid a flooding or overload of information between FHR 8 and RP 20 (e.g., register messages sent from FHR 8 to RP 20). In addition, the reliable transport mechanism may help minimize packet loss between FHR 8 and RP 20 over targeted neighbor connection 24.

In addition, the techniques of the present disclosure may provide for improved security between FHR 8 and RP 20 using targeted neighbor connection 24. As noted above, the reliable transport mechanism may help potentially avoid a flooding or overload of register messages or other information exchanged between FHR 8 and RP 20.

Furthermore, the present techniques may allow extensibility to achieve both intra- and inter-domain source discovery. As shown in FIG. 1, RP 20 and FHR 8 may establish targeted neighbor connection 24, and RP 20 may receive register messages from FHR 8 regarding active and withdrawn streams for source devices 2, 4 that are coupled to FHR 8. As also shown in FIGS. 4 and 5, FHR's may establish targeted neighbor connections with different RP's that share the same anycast address, and individual RP's may also establish targeted neighbor connections with other RP's that share the same anycast address. The FHR's may send register messages to any of these RP's regarding active and withdrawn streams for source devices coupled to these respective FHR's, and the FHR's may also discover the nearest or current anycast RP that services the given anycast address. In some instances, this may provide an automatic discovery process.

Figure 2:
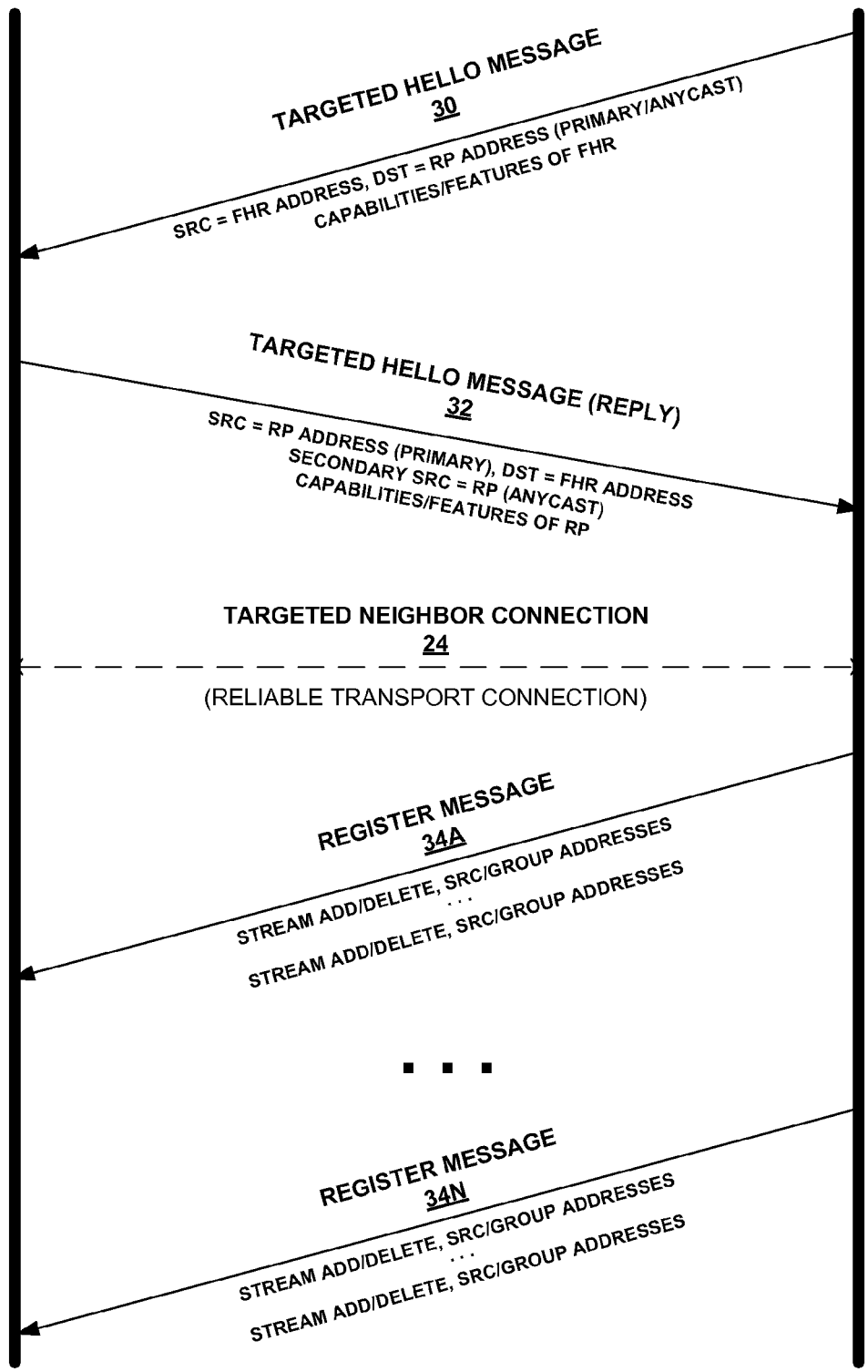
FIG. 2 is a diagram illustrating an example message flow between the RP and FHR illustrated in FIG. 1.

FIG. 2 is a diagram illustrating an example message flow between RP 20 and FHR 8 of FIG. 1. FIG. 2 illustrates one non-limiting example of such a message flow. Initially, upon learning of an address of RP 20, FHR 8 may send targeted hello message 30 to RP 20. Targeted hello message 30 is a unicast message that is addressed to RP 20. The primary source address of targeted hello message 30 is the address of FHR 8, while the destination address, comprising a unicast address, is either the primary or anycast address of RP 20. In some cases, targeted hello message 30 may further include information regarding one or more capabilities or features of FHR 8. RP 20 may process targeted hello message 30 to discover such capabilities or features and/or negotiate one or more of these capabilities or features with FHR 8.

Upon receiving targeted hello message 30, RP 20 may send targeted hello message 32 (reply) to FHR 8 to acknowledge receipt of targeted hello message 30 by RP 20. Targeted hello message 32 is a unicast message that is addressed to FHR 8. The primary source address of targeted hello message 32 is the primary address of RP 20, while the destination address, comprising a unicast address, is the primary address of FHR 8. In some instances, targeted hello message 32 may have a secondary source address, which may comprise an anycast address serviced by RP 20. In some cases, targeted hello message 32 may further include information regarding one or more capabilities or features of RP 20. FHR 8 may process targeted hello message 32 to discover such capabilities or features of RP 20 and/or negotiate one or more of these capabilities or features with RP 20 based on the capabilities or features supported by FHR 8.

As noted above, if RP 20 is configured as an anycast RP and services an anycast address, FHR 8 may initially send targeted hello message 30 with a unicast destination address that is the anycast address of RP 20. Upon receiving targeted hello message 32 from RP 20, FHR 8 is able to further identify the primary address of RP 20, which FHR 8 may use when subsequently sending one or more register messages to RP 20. In such fashion, FHR 8 is capable of identifying the primary address of anycast RP 20 (e.g., to discover the nearest or current anycast RP that services the anycast address with which FHR 8 may establish a targeted neighbor connection, namely RP 20). After FHR 8 and RP 20 exchange targeted hello messages 30 and 32, a targeted neighbor connection 24 is established between FHR 8 and RP 20, where FHR 8 may, in some cases, have the active role and RP 20 may have the passive role in the targeted neighborship. Targeted neighbor connection 24 may comprise a reliable transport connection.

FHR 8 may maintain neighbor state information (e.g., neighbor state information 108 shown in FIG. 3) that includes information about all of its targeted neighbors. For example, FHR 8 may store the primary address and secondary address (e.g., anycast address) of RP 20 in its neighbor state information, as well as any capabilities or features supported by RP 20 and/or negotiated between FHR 8 and RP 20. Similarly, RP 20 may maintain neighbor state information (e.g., neighbor state information 108) that includes information about all of its targeted neighbors. For example, RP 20 may store the primary address of FHR 8 in its neighbor state information, as well as any capabilities or features supported by FHR 8 and/or negotiated between FHR 8 and RP 20.

FHR 8 and RP 20 may also utilize refresh and hold timers when processing targeted hello messages (e.g., targeted hello message 30 and targeted hello message 32), which may be similar to timers outlined in RFC 4601, cited above. For example, in non-limiting cases, the default refresh time for targeted hello messages may be set to sixty seconds (e.g., 2 times the default link-level hello time outlined in RFC 4601), and the default hold time may be set to two hundred ten seconds (e.g., 3.5 times the default refresh time). In addition, FHR 8 and RP 20 may utilize keep-alive messages to check the liveliness of each other and targeted neighbor connection 24. In one example, these keep-alive messages may be similar to those described in RFC 6559, cited above, for reliable connection 24.

Regarding targeted neighbor connection 24, connection loss or reachability loss could occur for one or more of the following reasons: (1) keep-alive message time out; (2) targeted neighbor loss (e.g., expiration of the hold timer for targeted hello messages); and/or (3) close of the connection. Upon detecting any of these conditions, FHR 8 and/or RP 20 may close targeted neighbor connection 24 and clear any corresponding state information (e.g., after a grace period), such that FHR 8 and RP 20 may subsequently re-establish a new targeted neighbor connection and re-synchronize respective state information (e.g., respective neighbor state information 108 shown in FIG. 3) for the neighborship. As one note, should RP 20 and/or FHR 8 request termination of a targeted neighborship, RP 20 and/or FHR 8 may send a targeted hello message with a hold time as zero. In addition, if RP 20 and/or FHR 8, at a particular point in time, determine that a reconnect or a capability renegotiation with the other device is warranted, RP 20 and/or FHR 8 may, in some examples, change the generation identifier (or "GenID," as referred to in RFC 6559 and/or RFC 4601) of the targeted hello messages, in order to reset states and reinitialize the targeted neighbor connection between the two devices. In these examples, a GenID may be included in each of the targeted hello messages exchanged between the two devices.

After targeted neighbor connection 24 is established, FHR 8 may send one or more register messages for multicast streams to RP 20 using targeted neighbor connection 24 using the primary address of RP 20. As shown in the example of FIG. 2, FHR 8 sends one or messages 34A-34N to RP 20. Each of these register messages include multiple multicast stream data elements that each identify a source address and a group address that are collectively associated with a respective multicast stream. Furthermore, these register messages indicate, to RP 20, which multicast streams are active with FHR 8 and which streams have been withdrawn. (Example formats of a register message and multicast stream data elements are described in more detail below in reference to FIG. 7.) If a particular stream is active at FHR 8, the corresponding multicast stream data element of the register message may indicate that this particular stream is to be added to the stream state information maintained by RP 20 (e.g., stream state information 109 shown in FIG. 3). If, however, a particular stream is withdrawn at FHR 8, the corresponding multicast stream data element of the register message may indicate that this particular stream is to be deleted from the stream state information maintained by RP 20.

For example, if a group of multicast streams have become active with FHR 8, FHR 8 sends register message 34A to RP 20 with source and group addresses of these active streams, such that RP 20 is able to update its stream state information for streams that are active at FHR 8 and that are serviced by RP 20. The stream state information maintained by RP 20 identifies a respective source address and group address for each active multicast stream. Subsequently, if any of these streams are withdrawn at FHR 8, FHR 8 may send another register message (e.g., register message 34N) to RP 20 indicating the source and group addresses of the streams that have been withdrawn. Upon receiving this updated message, RP 20 updates its stream state information (e.g., deletes the source and group addresses for the withdrawn streams). In this way, once targeted neighbor connection 24 is established, FHR 8 is capable of continuously updating RP 20 with its existing and active multicast streams, as well as any streams that have been withdrawn.

Based upon the content of register messages 34A-34N sent by FHR 8, RP 20 updates its stream state information for active multicast streams serviced by RP 20. The stream state information identifies a respective source address and group address for each active multicast stream, and may also identify the device from which the source and group address information is received (e.g., FHR 8). As one example, in a given register message 34A-34N received from FHR 8, for each multicast stream that is indicated as active in the multicast stream data elements, RP 20 may add the respective source address and group address to its stream state information. On the other hand, for each multicast stream that is indicated as withdrawn in the multicast stream data elements of the given register message, RP 20 may remove the respective source address and group address its stream state information.

To provide a non-limiting example of the processing of such register messages 34A-34N, FHR 8 may send RP 20 a first register message 34A, via targeted neighbor connection 24, which includes a group of multicast stream data elements. In this example, the group of multicast stream data elements included in register message 34A may be associated with a first group of multicast streams, namely STREAM 1, STREAM 2, and STREAM 3, which are each serviced by FHR 8.

For instance, a first multicast stream data element may identify a first source address S1 and a first group address G1 that are collectively associated with STREAM 1. This first multicast stream data element further indicates that STREAM 1 is active at FHR 8 (e.g., by indicating that S1 and G1 are to be added to the stream state information maintained by RP 20). Similarly, a second multicast stream data element identifies a second source address S2 and a second group address G2 that are collectively associated with STREAM 2, and also indicates that STREAM 2 is active at FHR 8. A third multicast stream data element identifies a third source address S3 and a third group address G3 that are collectively associated with STREAM 3, and also indicates that STREAM 3 is active at FHR 8.

Upon receipt of register message 34A, RP 20 may update its stream state information by adding, to the state information and based on the first multicast stream data element in register message 34A, a first entry identifying the first source address S1 and the first group address G1 for STREAM 1. Similarly, RP 20 may add, based on the second multicast stream data element, a second entry identifying the second source address S2 and the second group address G2 for STREAM 2, and may add, based on the third multicast stream data element, a third entry identifying the third source address S3 and the third group address G3 for STREAM 3. The first, second, and third entries in the stream state information of RP 20 indicate that STREAM 1, STREAM 2, and STREAM 3, respectively, are active at FHR 8.

However, at a later point in time, if STREAM 1 becomes withdrawn at FHR 8, but a new stream, STREAM 4, becomes active, FHR 8 may send a separate register message 34N to RP 20 via targeted neighbor connection 24. Register message 34N includes a group of multicast stream data elements, where a first data element identifies the first source address S1 and the first group address G1 collectively associated with STREAM 1, and further indicates that STREAM 1 is now withdrawn at FHR 8 (e.g., by indicating that S1 and G1 are to be deleted from the stream state information maintained by RP 20). Register message 34N includes a second multicast stream data element that identifies a fourth source address S4 and a fourth group address G4 that are collectively associated with STREAM 4, and also indicates that STREAM 4 is active at FHR 8 (e.g., by indicating that S4 and G4 are to be added to the stream state information maintained by RP 20).

Upon receipt of register message 34N, RP 20 updates its stream state information by removing, from the state information and based on the first multicast stream data element in register message 34N, the first entry identifying the first source address S1 and the first group address G1 for the STREAM 1. Additionally, RP 20 may add, based on the second multicast stream data element in register message 34N, a fourth entry identifying the fourth source address S4 and the fourth group address G4 for STREAM 4, indicating that STREAM 4 is active at FHR 8. In such fashion, FHR 8 is able to update RP 20 with its existing, active multicast streams by sending incremental updates to RP 20. In response, RP 20 is able to update the stream state information for any multicast streams that are active at FHR 8 and that are serviced by RP 20.

Figure 3:
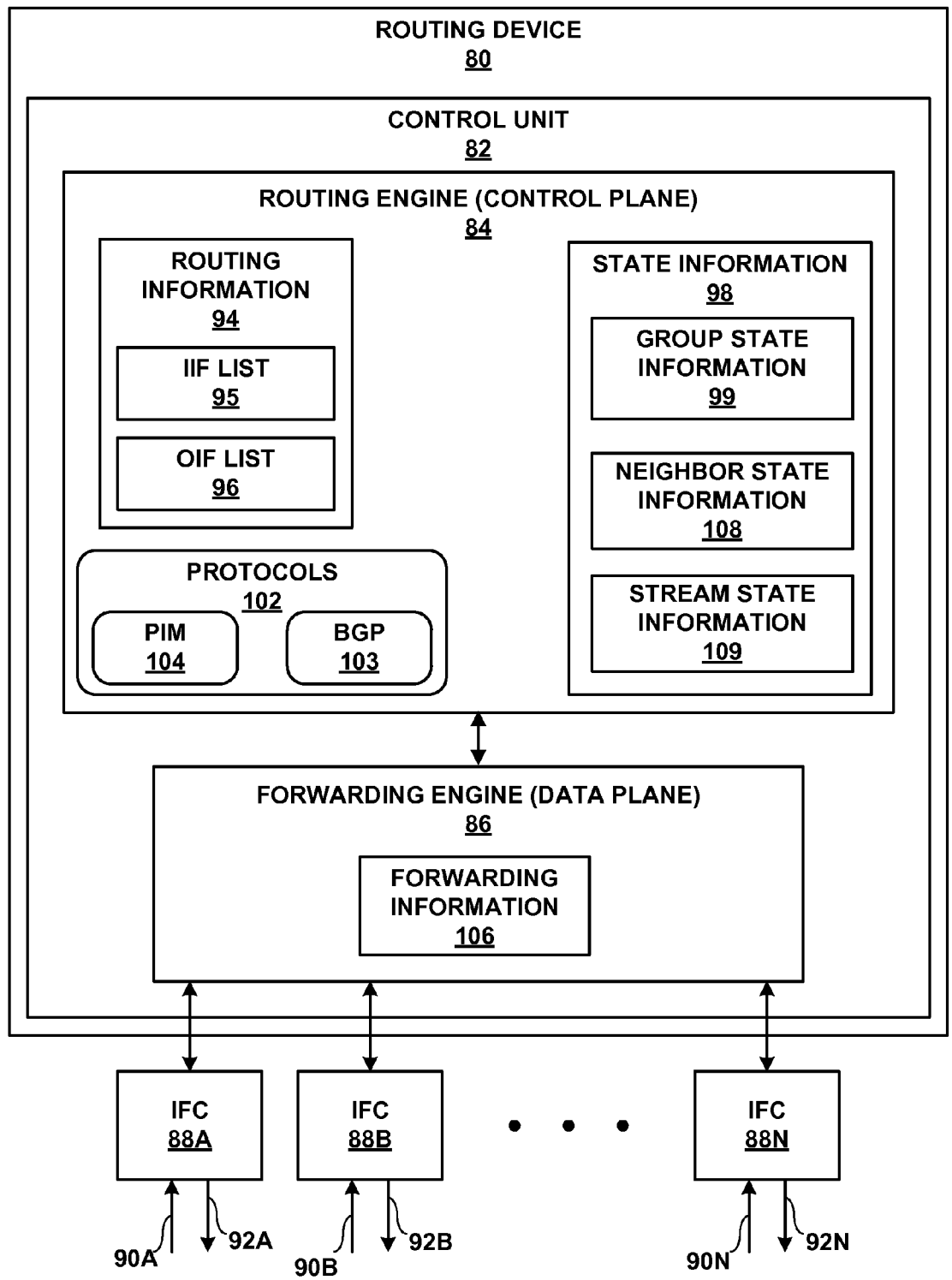
FIG. 3 is a block diagram illustrating an example routing device, such as one of the routing devices shown in FIG. 1 or FIG. 2.

FIG. 3 is a block diagram illustrating an example routing device 80, such as one of the routing devices shown in FIG. 1 or FIG. 2. For example, any of routing devices 8, 10, 12, 14, 16, 18, 20, and/or 22 may comprise routing device 80 illustrated in FIG. 3.

In this example, routing device 80 includes interface cards 88A-88N ("IFC's 88") that receive multicast packets via incoming links 90A-90N ("incoming links 90") and send multicast packets via outbound links 92A-92N ("outbound links 92"). IFC's 88 are typically coupled to links 90, 92 via a number of interface ports. Routing device 80 also includes a control unit 82 that determines routes of received packets and forwards the packets accordingly via IFC's 88.

Control unit 82 may comprise a routing engine 84 and a forwarding engine 86. Routing engine 84 operates as the control plane for routing device 80 and includes an operating system that may provide a multi-tasking operating environment for execution of a number of concurrent processes. Routing engine 84 may implement one or more routing protocols 102 to execute routing processes. For example, routing protocols 102 may include Border Gateway Protocol (BGP) 103, for exchanging routing information with other routing devices in a computer network (e.g., network 1) and for updating routing information 94. Routing engine 84 may also implement Interior Gateway Protocol (IGP) protocols, such as link state routing protocols Open Shortest Path First (OSPF) and/or Intermediate System-to-Intermediate System (IS-IS), for exchanging link state information with other routing.

Routing information 94 may describe a topology of the computer network in which routing device 80 resides, and may also include routes through the shared trees in the computer network. Routing information 94 describes various routes within the computer network, and the appropriate next hops for each route, e.g., the neighboring routing devices along each of the routes. In the illustrated example, routing information 94 includes an incoming interface (IIF) list 95 and an outgoing interface (OIF) list 96 that indicates which of IFC's 88 are connected to neighboring routing devices in each route. For example, a given route may comprise a route for multicast traffic for a given multicast group G. In that example, IIF list 95 may include a list of interfaces to all downstream routing devices in the shared tree, and OIF list 96 may include a list of interfaces to upstream and downstream routing devices that have state for the multicast group.

In addition, routing protocols 102 may include PIM 104, and specifically PIM SM, for routing multicast traffic through the computer network (e.g., network 1) with other routing devices conceptually formed into shared trees according to routing information 94 and state information 98. Routing engine 84 may also implement PIM 104 to update state information 98. State information 98 may describe a current status of links between routing devices in the shared trees for the network. In the illustrated example, state information 98 includes group state information 99 that describes which neighboring routing devices belong to which multicast groups within the range for the shared tree.

Routing engine 84 analyzes stored routing information 94 and state information 98 and generates forwarding information 106 for forwarding engine 86. Forwarding information 106 may associate, for example, network destinations for certain multicast groups with specific next hops and corresponding IFC's 88 and physical output ports for output links 92. Forwarding information 106 may be a radix tree programmed into dedicated forwarding chips, a series of tables, a complex database, a link list, a radix tree, a database, a flat file, or various other data structures. In the illustrated example of FIG. 3, forwarding information 106 includes forwarding routes that include specific routes to forward multicast traffic for a given multicast group to neighboring routing devices. In general, when routing device 80 receives a multicast packet via one of inbound links 90, control unit 82 determines a next hop for the packet in accordance with forwarding information 106, and forwards the packet according to the next hop.

As shown in FIG. 3, and as described above in reference to FIG. 2, state information 98 also includes neighbor state information 108 and stream state information 109. Routing device 80 may maintain neighbor state information 108 to include information about all of its targeted neighbors and targeted neighbor connections. Routing device 80 may store, in neighbor state information 108, the addresses of targeted neighbors with which it has established targeted neighbor connections, as well as any capability or feature information that is associated with each of such connections. For example, if routing device 80 comprises an FHR (e.g., FHR 8) that has established a targeted neighbor connection (e.g., targeted neighbor connection 24) with an RP (e.g., RP 20), routing device may store the primary address and any secondary address (e.g., anycast address) of the RP in neighbor state information 108, as well as any capabilities or features that are supported by the RP or that have been negotiated between the two devices. In general, neighbor state information 108 may include any such address and capability/feature information.

State information 98 further includes stream state information 109, which includes information associated with active streams that are serviced by routing device 80. Routing device 80 maintains and updates stream state information 109 in response to receiving register messages (e.g., register messages 34A-34N shown in FIG. 2) from another routing device. For example, routing device 80 may receive a register message from a second routing device to indicate that a group of one or more multicast streams have become active at the second routing device. In such an example, routing device 80 may store the source and group addresses associated with each of these active streams in stream state information 109. Stream state information 109 identifies respective source and group addresses for each active multicast stream. In some instances, routing device 80 may also store, in stream state information 109, the address (e.g., primary address) of the second routing device from which it has received the source and group address information.

Subsequently, if any of these streams are withdrawn at the second routing device, routing device 80 may receive another register message from the second routing device specifying the source and group addresses of the streams that have been withdrawn. Upon receiving this updated message, routing device 80 updates its stream state information 109 (e.g., deletes the source and group addresses for the withdrawn streams). In this way, once a targeted neighbor connection is established with routing device 80, routing device 80 is capable of continuously updating its stream state information 109 to add source and group address information for existing and active multicast streams, and to delete source and group address information for any streams that have been withdrawn.

The architecture of routing device 80 illustrated in FIG. 3 is shown for exemplary purposes only. The disclosure is not necessarily limited to this architecture. In other examples, routing device 80 may be configured in a variety of ways. In one example, some of the functionality of control unit 82 may be distributed within IFC's 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors that execute software instructions. In that case, the various software modules of control unit 82 may comprise executable instructions stored on a computer-readable storage medium, such as computer memory or storage device.

Figure 4:
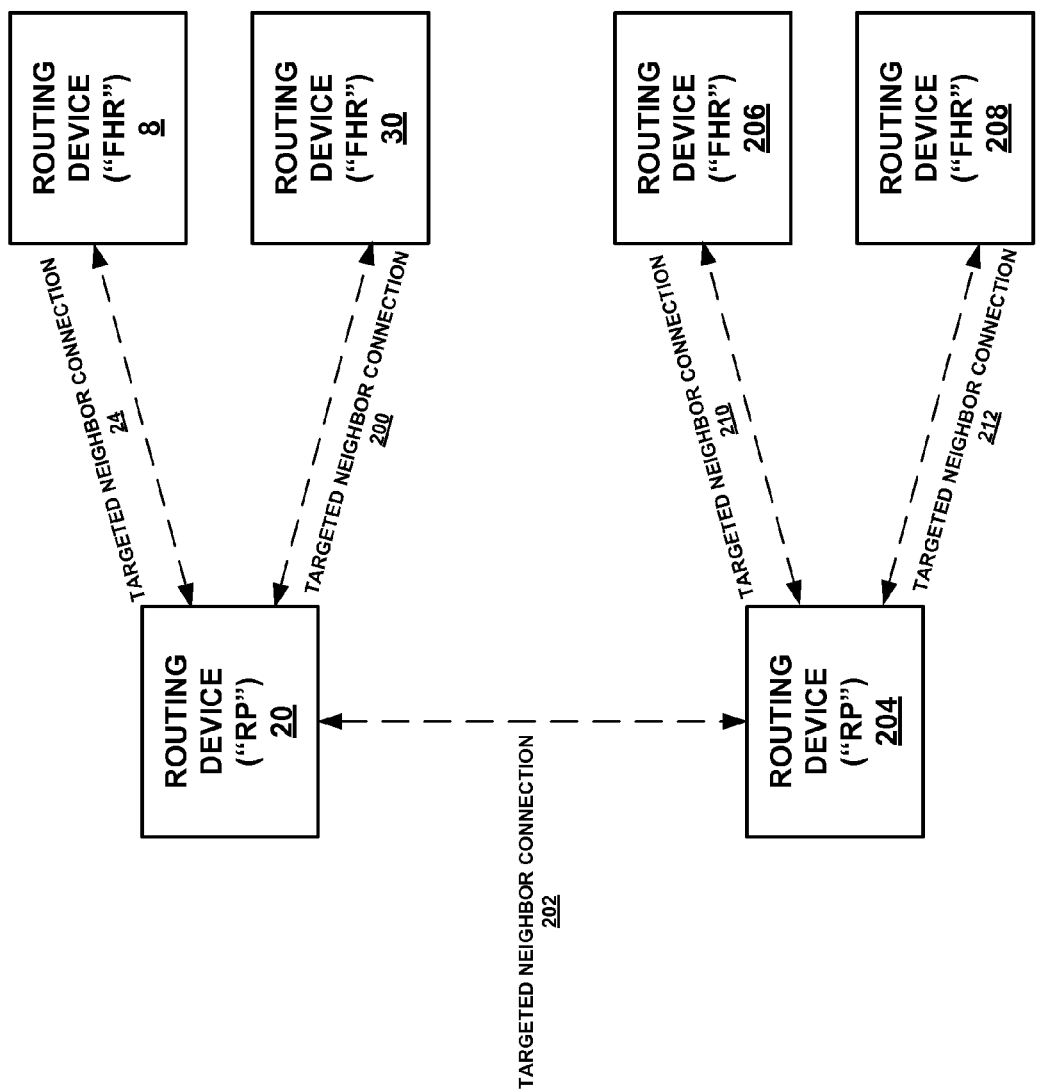
FIG. 4 is a block diagram illustrating an example of targeted neighbor connections that are established between multiple RP's and multiple FHR's.
Figure 5:
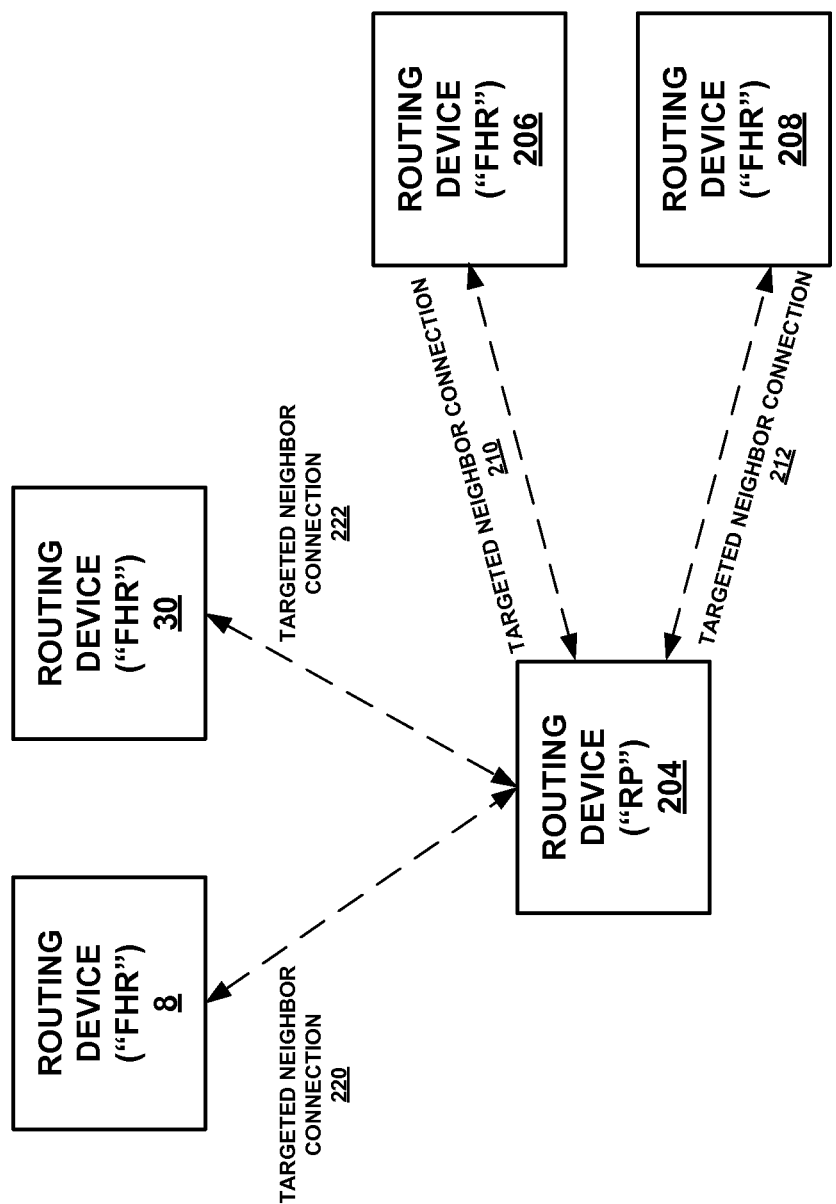
FIG. 5 is a block diagram illustrating example FHR's that establish targeted neighbor connections with a second RP after initial connections with a first RP have been closed.

FIG. 4 is a block diagram illustrating an example of targeted neighbor connections that are established amongst multiple RP's and multiple FHR's. In the example of FIG. 4, two separate RP's, namely RP 20 and RP 204, are each communicatively coupled to multiple different FHR's. In general, each RP may establish a respective targeted neighbor connection with one or more FHR's, and each RP may also be capable of establishing a respective targeted neighbor connection with one or more other RP's. In particular, in some examples, RP's may form targeted neighborships with each other if these RP's service the same anycast address, or if these RP's also act as FHR's for different multicast sources. In the examples of FIGS. 4 and 5, each of the illustrated targeted neighbor connections may comprise a reliable transport connection.

Referring to FIG. 4, RP 20 has established a targeted neighbor connection 24 with FHR 8 and a separate targeted neighbor connection 200 with FHR 30. RP 20 and FHR 8 may establish targeted neighbor connection 24 in a manner similar to that described above. In a similar fashion, RP 20 and FHR 30 may establish targeted neighbor connection 200. Each of RP 20, FHR 8, and FHR 30 may each store neighbor state information (e.g., neighbor state information 108 shown in FIG. 3) associated with its respective targeted neighbors and targeted neighbor connections. For example, FHR 8 may maintain neighbor state information for targeted neighbor connection 24 to indicate a targeted neighborship with RP 20. This state information may include the primary address of RP 20, any secondary (e.g., anycast) addresses of RP 20, and any capabilities/features of RP 20 and/or FHR 8 that are associated with targeted neighbor connection 24. FHR 30 may maintain similar neighbor state information for targeted neighbor connection 200.

RP 20 may maintain neighbor state information regarding both targeted neighbor connection 24 with FHR 8 and targeted neighbor connection 200 with FHR 30. For targeted neighbor connection 24, the neighbor state information of RP 20 may indicate a targeted neighborship with FHR 8 and may include the address of FHR 8 and any capabilities/features of RP 20 and/or FHR 8 that are associated with targeted neighbor connection 24. RP 20 may maintain similar state information regarding FHR 30 for targeted neighbor connection 200.

As shown in FIG. 4, a second and separate RP 204 is communicatively coupled to FHR 206 and FHR 208. RP 204 has established a targeted neighbor connection 210 with FHR 206 and a separate targeted neighbor connection 212 with FHR 208 in a manner similar to that described above. Each of RP 204, FHR 206, and FHR 208 may also each store neighbor state information (e.g., neighbor state information 108 shown in FIG. 3) associated with its respective targeted neighbors and targeted neighbor connections in a manner similar to that described above. FHR 8, FHR 30, FHR 206, and FHR 208 may each be communicatively coupled to one or more source devices. (For example, as shown in FIG. 1, FHR 8 may be coupled to source devices 2, 4.)

In addition, RP 20 and RP 204 may establish targeted neighbor connection 202, which is a connection between the two individual RP's. To do so, RP 20 and RP 204 may exchange targeted hello messages and each store state information about targeted neighbor connection 202, including the respective primary addresses of RP 20 or RP 204 and potentially any capabilities/features of RP 20 and RP 204 that are associated with targeted neighbor connection 202.

Furthermore, RP 20 and RP 204 may also support PIM ASM and each serve the same anycast address. In general, an RP that serves an anycast address may be configured to store the primary addresses of other RP's serving the same anycast address, and these RP's may collectively form a full mesh of targeted neighborships. Thus, if both RP 20 and RP 204 serve the same anycast address, RP 20 stores the primary address of RP 204, and RP 204 stores the primary address of RP 20. By forming a targeted neighborship between RP 20 and RP 204, any of FHR 8, FHR 30, FHR 206, and/or FHR 208 may establish targeted neighbor connections with RP 20 or RP 204, given that RP 20 and RP 204 share the same anycast address. In addition, if any of FHR 8, FHR 30, FHR 206, and/or FHR 208 has established a targeted neighbor connection with one of RP 20 or RP 204, and this respective connection is lost (e.g., due to a failure or other issue), FHR 8, FHR 30, FHR 206, and/or FHR 208 may establish a targeted neighbor connection with the other one of RP 20 or RP 204.

In the example of FIG. 4, each of FHR 8, FHR 30, FHR 206, and FHR 208 may store the anycast address that is shared by both RP 20 and RP 204. In certain examples, the techniques of the present disclosure allow any of these FHR's to discover the primary address of RP 20 and/or RP 204 through the exchange of targeted hello messages. Once FHR 8, FHR 30, FHR 206, and/or FHR 208 has received a targeted hello message from RP 20 or RP 204 (e.g., targeted hello message 32 shown in FIG. 2) during establishment of a respective targeted neighbor connection, FHR 8, FHR 30, FHR 206, and/or FHR 208 may process the targeted hello message to identify the primary address of RP 20 or RP 204, which is included in the targeted hello message. The anycast address and the primary address of RP 20 and/or RP 204 may be stored in neighbor state information 108 (FIG. 2). As a result, at any point in time, any of FHR 8, FHR 30, FHR 206, and/or FHR 208 may be able to discover the primary address of the nearest or current anycast RP (e.g., primary address of RP 20 or RP 204), which services a given anycast address, through the exchange of targeted hello messages with RP 20 or RP 204.

In the particular example shown in FIG. 4, where RP 20 and RP 204 share the same anycast address, RP 20 may be the nearest or current anycast RP for FHR 8 and FHR 30, as indicated by targeted neighbor connections 24 and 200, respectively. Likewise, RP 204 may be the nearest or current anycast RP for FHR 206 and FHR 208, as indicated by targeted neighbor connections 210 and 212, respectively. As will be described in more detail below in reference to FIG. 5, if a given targeted neighbor connection with one of RP 20 or RP 204 is lost (e.g., due to failure or other issues), any of FHR 8, FHR 30, FHR 206, and/or FHR 208 may exchange targeted hello messages with the other of RP 20 or RP 204 to identify the primary address of this other RP, which may serve as the next nearest or current anycast RP having the same anycast address.

Once targeted neighbor connections 24 and 200 have been established, FHR 8 and FHR 30 may send register messages to RP 20 in a manner similar to that described above, such as in reference to FIG. 2, and RP 20 may update its stream state information accordingly. For example, FHR 8 may send one or more register messages for multicast streams to RP 20 using targeted neighbor connection 24. Each of these register messages include multiple multicast stream data elements that each identify a source address and a group address that are collectively associated with a respective multicast stream. Furthermore, these register messages indicate, to RP 20, which multicast streams are active with FHR 8 and which streams have been withdrawn. Similarly, FHR 30 may send RP 20 one or more register messages using targeted neighbor connection 200, where the register messages indicate which multicast streams at FHR 30 are active or withdrawn. Upon receiving these register messages, RP 20 updates its stream state information (e.g., stream state information 109 shown in FIG. 3) to, e.g., add or delete source and group address information based on whether the respective stream is being added or deleted.

In addition, however, if RP 20 is configured as an anycast RP, RP 20 transmits these state messages to any other RP's that have the same anycast address. Thus, if both RP 20 and RP 204 have the same anycast address, RP 20 may transmit, to RP 204, any register messages it receives from FHR 8 and/or FHR 30. Responsive to receiving such register messages, RP 204 may update its own stream state information for multicast streams associated with FHR 8 and/or FHR 30 based on the source and group address information contained in these messages. RP 204 will not retransmit the register messages received from RP 20. In such fashion, RP 204 may use its targeted neighbor connection 202 with RP 20 as a portion of a full mesh of targeted neighbor connections among anycast RP's of the same anycast address to maintain stream state information about multicast streams associated with FHR 8 and FHR 30.

RP 204 may also receive register messages from FHR 206 using targeted neighbor connection 210, and may also receive register messages from FHR 208 using targeted neighbor connection 212, thereafter updating its stream state information accordingly. If both RP 20 and RP 204 are configured as anycast RP's sharing the same anycast address, RP 204 may also transmit, to RP 20, any register messages it receives from FHR 206 and/or FHR 208. RP 20 will not retransmit the register messages received from RP 204. RP 20 then updates its stream state information for the multicast streams associated with FHR 206 and/or FHR 208. Thus, RP 20 may use its targeted neighbor connection 202 with RP 204 as a portion of a full mesh of targeted neighbor connections among anycast RP's of the same anycast address to maintain stream state information about multicast streams associated with FHR 206 and FHR 208.

In some examples, an RP does not retransmit any register messages it has received from another anycast RP having the same anycast address. Thus, if, for example, both RP 20 and RP 204 are configured as anycast RP's sharing the same anycast address, and RP 204 receives, from RP 20, one or more register messages sent from FHR 8 and/or FH 30, RP 204 does not retransmit these messages to another RP. Similarly, in this example, RP 20 does not retransmit any register messages it receives from RP 204.

FIG. 5 is a block diagram illustrating example FHR's that establish targeted neighbor connections with a second RP after their initial connections with a first RP have been closed. For example, continuing with the example of FIG. 4, after initially establishing all of the initial targeted neighbor connections shown in FIG. 4, it is possible that there may be an issue and/or failure with RP 20. In such a scenario, targeted neighbor connection 24 with FHR 8 and targeted neighbor connection 200 with FHR 30 may be closed by RP 20 or otherwise fail (e.g., upon closure of the connection, expiration of hello message hold and/or keep-alive timers). For example, FHR 8 may determine that its targeted neighbor connection 24 with RP 20 has been closed or otherwise failed, and FHR 30 may determine that its targeted neighbor connection 200 with RP 20 has been closed or otherwise failed.

Assuming, however, that RP 20 and RP 204 had initially been configured as anycast RP's that share the same anycast address, both FHR 8 and FHR 30 may establish new targeted neighbor connections with RP 204 as the next nearest anycast RP to FHR 8 and FHR 30, as shown in FIG. 5. In its neighbor state information (e.g., neighbor state information 108 shown in FIG. 3), each of FHR 8 and FHR 30 may have previously stored the anycast address of RP 20. Upon closure of these targeted neighbor connections with RP 20, FHR 8 and FHR 30 may each clear out the stored state information corresponding to these connections, and may also utilize the stored anycast address of RP 20, which is shared by RP 204, to establish new targeted connections with RP 204 and to store updated neighbor state information for these new connections.

FHR 8 may exchange targeted hello messages with RP 204 to establish targeted neighbor connection 220, as shown in FIG. 5, and FHR 30 may exchange targeted hello messages with RP 204 to establish targeted neighbor connection 222. Each of FHR 8 and FHR 30 may use the anycast address of RP 204 when sending targeted hello messages to RP 204. During the exchange of these hello messages, both FHR 8 and FHR 30 may receive and store the primary address of RP 204. Each of FHR 8, FHR 30, and RP 204 may update its respective neighbor state information (e.g., neighbor state information 108) to store state information about the targeted neighborship between FHR 8 and RP 204 or between FHR 30 and RP 204. Because RP 204 shares the same anycast address as RP 20, FHR 8 and FHR 30 are each capable of identifying the primary address of RP 204 during the exchange of targeted hello messages (e.g., to discover the new, nearest or current anycast RP with which FHR 8 and FHR 30 may establish targeted neighbor connections, namely RP 204).

Upon establishment of targeted neighbor connections 220 and 222, FHR 8 and FHR 30 may respectively begin sending register messages to RP 204 (e.g., using the primary address of RP 204) regarding the status of any respective active or withdrawn multicast streams, similar to the techniques described above. Upon receiving these register messages, RP 204 updates its stream state information (e.g., stream state information 109 shown in FIG. 3) regarding the state of multicast streams handled by FHR 8 and FHR 30, respectively. In such fashion, when RP 20 and RP 204 are initially configured as anycast RP's that share the same anycast address, FHR 8 and FHR 30 may transition from a first RP to a second RP in the case of a failover or other issue, and may continue sending register messages to this second RP such that processing of multicast traffic may continue.

FIG. 6 is a conceptual diagram illustrating an example representation of a targeted hello message. In some examples, the representation of a targeted hello message may be referred to as a type-length-value, or TLV, representation. The various targeted hello messages discussed throughout this disclosure, including targeted hello messages 30 and 32 shown in FIG. 2, may have the format shown in FIG. 6. As noted previously, targeted hello messages have a unicast address as the destination address, and they traverse multiple hops using unicast routing to reach a targeted hello neighbor identified by the destination address.

As shown in the example of FIG. 6, a targeted hello message may include fields 300, 302, 304, 306, 308, and 310. Field 300 has a value that specifies the message type for a targeted hello message (e.g., value of thirty six for a targeted hello message type). Field 302 has a value that specifies the combined byte length of fields 304, 306, 308, and 310 (e.g., value of four bytes). In non-limiting examples, each of fields 300 and 302 are two bytes in length.

Field 304 has a value specifying whether the sender of the targeted hello message requests having the role of a FHR in the targeted neighborship. In one example, field 304 is one bit in length and has a value of one (e.g., sender requests having role of a FHR) or zero (e.g., sender does not request having role of a FHR).

Field 306 has a value specifying whether the sender of the targeted hello message is a device that is capable of taking the role of an RP in the targeted neighborship as per current states. In one example, field 306 is one bit in length and has a value of one (e.g., sender is capable of having role of an RP) or zero (e.g., sender is not capable of having role of an RP). If a particular RP serves an anycast RP address, this RP should, in some examples, set the value of field 306 to one.

Field 308 may comprise a reserved field that is set to zero on transmission and ignored on receipt. In one example, field 308 is twenty six bits in length.

Finally, field 310 may be provided for certain (e.g., experimental) uses, such as signaling experimental capabilities or features. For example, if a sender supports a particular capability or feature, it may set the value of field 310 accordingly. The routing devices that exchange targeted hello messages may use the information in field 310 of such messages to discover and/or negotiate one or more capabilities/features when establishing the targeted neighbor connection. In one example, field 310 is four bits in length.

Figure 7:
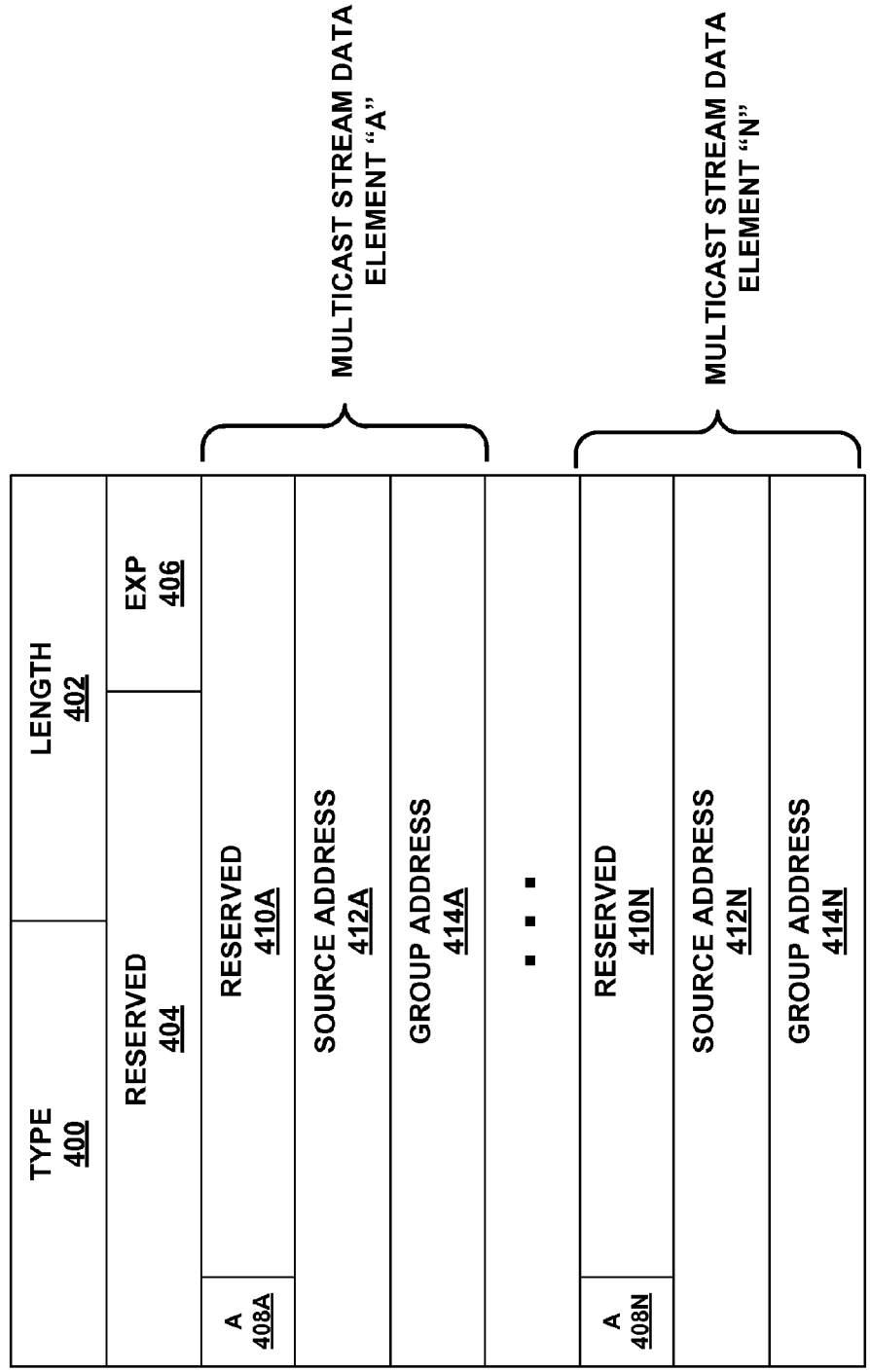
FIG. 7 is a conceptual diagram illustrating an example representation of a register message.

FIG. 7 is a conceptual diagram illustrating an example representation of a register message. In some examples, the representation of a register message may be referred to as a type-length-value, or TLV, representation. The various register messages discussed throughout this disclosure, including register messages 34A-34N shown in FIG. 2, may have the format shown in FIG. 7.

As shown in the example of FIG. 7, a register message may include fields 400, 402, 404, 406, 408A-408N, 410A-410N, 412A-412N, and 414A-414N. Field 400 has a value that specifies the message type (e.g., value of three for IPv4 multicast streams, value of four for IPV6 multicast streams). Field 402 has a value that specifies the collective byte length of fields 404, 406, 408A-408N, 410A-410N, 412A-412N, and 414A-414N. In non-limiting examples, each of fields 400 and 402 are two bytes in length.

Field 404 is a reserved field having a value that may, in some cases, merely be set to zero on transmission and ignored on receipt. In certain cases, however, the value of field 404 may be associated with properties that apply to the entire message. Field 406 may also be reserved for experimental use. In non-limiting examples, field 404 is twenty eight bits in length and field 406 is four bits in length.

As discussed previously, each register message may include a plurality of multicast stream data elements. For instance, in the example of FIG. 7, the values of fields 408A, 410A, 412A, and 414A may be associated with multicast stream data element "A," and the values of fields 408N, 410N, 412N, and 414N may be associated with multicast stream data element "N." Multicast stream data element "A" is associated with a particular multicast stream "A," and multicast stream element "N" is associated with a particular multicast stream "N."

Field 410A is a reserved field having a value that may, in some cases, merely be set to zero on transmission and ignored on receipt. In certain cases, however, the value of field 410A may be associated with properties that apply to multicast stream "A" and/or the source and group address included in multicast stream data element "A." In non-limiting examples, field 410A is thirty one bits in length.

Field 408A designates whether source address 412A and group address 414A is to be added or deleted. In one example, field 408A is one bit in length that has a value of one (e.g., add) or zero (e.g., delete). When a FHR sets the value of field 408A to indicate that source address 412A and group address 414A are to be added, FHR has identified multicast stream "A" to be an active stream at the FHR, such that the RP may add the stream state information (e.g., source address 412A and group address 414A) for this stream. On the other hand, if the value of field 408A indicates that source address 412A and group address 414A are to be deleted, FHR has identified multicast stream "A" to be withdrawn at the FHR, such that the RP may delete the stream state information (e.g., source address 412A and group address 414A) for this stream.

Field 412A specifies the source address associated with multicast stream "A." In non-limiting examples, field 412A has a byte length of four and a value corresponding to a source address of an IPv4 stream without any encoding, while in other examples, field 412A has a byte length of sixteen and a value corresponding to a source address of an IPv6 stream without any encoding.

Field 414A specifies the group address associated with multicast stream "A." In non-limiting examples, field 414A has a byte length of four and a value corresponding to a group address of an IPv4 stream without any encoding, while in other examples, field 414A has a byte length of sixteen and a value corresponding to a group address of an IPv6 stream without any encoding.

Fields 408N, 410N, 412N, and 414N are similar to fields 408A, 410A, 412A, and 414A but correspond instead to multicast stream data element "N." Any number of multicast stream data elements may be included within a given register message, and each particular multicast stream data element is associated with a respective multicast stream that is either active (e.g., to be added) or withdrawn (e.g., to be deleted).

Figure 8:
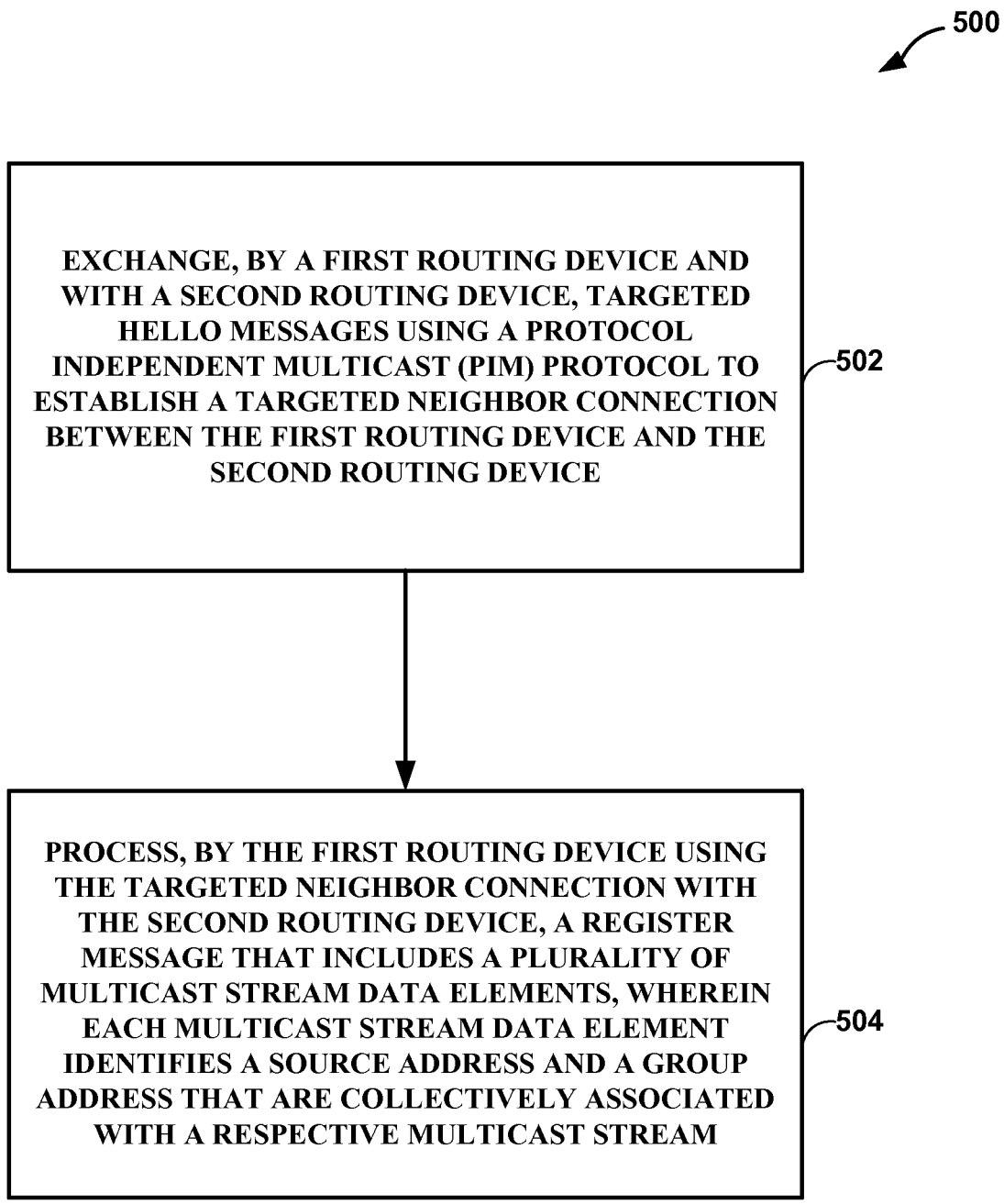
FIG. 8 is a flow diagram illustrating an example process that may be implemented by a routing device, such as by one or more of the RP's or FHR's shown in FIGS. 1-5.

FIG. 8 is a flow diagram illustrating an example process 50 that may be implemented by a routing device, such as by one or more of the RP's or FHR's shown in FIGS. 1-5. Process 500 includes operations 502 and 504, as well as various other possible operations recited below.

As shown in FIG. 8, a first routing device may exchange, with a second routing device, targeted hello messages using a PIM protocol to establish a targeted neighbor connection between the first routing device and the second routing device (502). The first routing device exchanges the targeted hello messages with the second routing device via at least one intermediate routing device (e.g., routing device 16 and/or 18 shown in FIG. 1), and at least one of the first routing device or the second routing device comprises an RP. The first routing device uses the targeted neighbor connection with the second routing device to process a register message that includes multicast stream data elements (504). Each multicast stream data element identifies a source address and a group address that are collectively associated with a respective multicast stream, and each multicast stream data element further indicates whether the respective multicast stream is active or withdrawn.

For example, the first routing device may comprise the RP (e.g., RP 20) and the second routing device may comprise a FHR (e.g., FHR 8) that is coupled to at least one source device providing at least one multicast stream. In this example, the targeted neighbor connection comprises a reliable transport connection, and exchanging the targeted hello messages comprises receiving, by the RP and from the FHR, a first targeted hello message (e.g., targeted hello message 30) comprising a first unicast message that is addressed to the RP, and sending, by the RP and to the FHR, a second targeted hello message (targeted hello message 32) to acknowledge receipt of the first targeted hello message, where the second targeted hello message comprises a second unicast message that is addressed to the FHR, where a source address of the second targeted hello message comprises a primary address of the RP, and where a secondary address of the second targeted hello message comprises an anycast address of the RP. Processing the register message comprises receiving, by the RP and from the FHR using the targeted neighbor connection, the register message (e.g., register message 34A or 34N), where the register message is sent by the FHR to the primary address of the RP.

The RP may update, based on the register message, state information (e.g., stream state information 109) for multicast streams that are active at the FHR and serviced by the RP, where the state information identifies a respective source address and group address for each active multicast stream. For instance, for each multicast stream that is indicated as active in the multicast stream data elements of the register message, the RP may update the state information at least by adding the respective source address and group address to the state information. For each multicast stream that is indicated as withdrawn in the multicast stream data elements of the register message, the RP may remove the respective source address and group address from the state information.

To provide one non-limiting example, the RP may receive a first register message that includes a first plurality of multicast stream data elements. One of the first plurality of multicast stream data elements identifies a particular source address and a particular group address that are collectively associated with a particular multicast stream, and this multicast stream data element may further indicate that the particular multicast stream is active at the FHR. The RP may update the state information at least by adding, to the state information, an entry identifying the particular source address and the particular group address that are collectively associated with the particular multicast stream, the entry indicating that the particular multicast stream is active at the FHR.

After receiving the first register message, the RP may receive, from the FHR using the targeted neighbor connection, a second register message that includes a second plurality of multicast stream data elements, where one of the second plurality of multicast stream data elements identifies the particular source address and the particular group address collectively associated with the particular multicast stream. This multicast stream data element may further indicate that the particular multicast stream is now withdrawn at the FHR. In response, the RP removes, from the state information, the entry identifying the particular source address and the particular group address for the particular multicast stream.

In some examples, the RP comprises a first RP having the anycast address, and the targeted hello messages comprise a first plurality of targeted hello messages. The first RP may be an anycast RP that shares the same anycast address with a second RP (e.g., RP 204) having the same anycast address as the first RP. The first RP is capable of exchanging, with the second RP, a second plurality of hello messages to establish a targeted neighbor connection between the first RP and the second RP. Upon receiving a register message from the FHR, the first RP uses its targeted neighbor connection with the second RP to send, to the second RP, the register message received from the FHR. The second RP does not retransmit the register message received from the first RP.

Referring back to operations 502 and 504 shown in FIG. 8, in some examples, the first routing device comprises a first hop router (FHR) coupled to at least one source device that provides at least one multicast stream, and the second routing device comprises the RP. In these examples, the targeted neighbor connection comprises a reliable transport connection, and exchanging the targeted hello messages comprises sending, by the FHR and to the RP, a first targeted hello message comprising a first unicast message that is addressed to the RP, and receiving, by the FHR and from the RP, a second targeted hello message to acknowledge receipt of the first targeted hello message, the second targeted hello message comprising a second unicast message that is addressed to the FHR. A source address of the second targeted hello message comprises a primary address of the RP, and a secondary address of the second targeted hello message comprises an anycast address of the RP. Processing the register message comprises sending, by the FHR and to the primary address of the RP using the targeted neighbor connection, the register message. If the first targeted hello message is addressed to an anycast address of the RP. In some cases, as described earlier, the FHR may send the first targeted hello message to the anycast address of the RP.

If the RP comprises a first RP that shares the same anycast address with a second RP, the plurality of targeted hello messages comprises a first plurality of targeted hello messages, at a given point in time, the FHR may determine that the targeted neighbor connection with the first RP has failed. In response, the FHR may exchange, with the second RP, a second plurality of targeted hello messages to establish a targeted neighbor connection between the FHR and the second RP, wherein the first RP and the second RP share the same anycast address.

Furthermore, as previously described, the exchange of targeted hello messages may include discovering and/or negotiating one or more capabilities or features of the first and/or second routing device. These capabilities or features may be stored in the state information of each respective routing device (e.g., neighbor state information 108 shown in FIG. 3)

The techniques described in this disclosure may be implemented, at least in part, in hardware, software, firmware or any combination thereof. For example, various aspects of the described techniques may be implemented within one or more processors, including one or more microprocessors, digital signal processors (DSP's), application specific integrated circuits (ASIC's), field programmable gate arrays (FPGA's), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable medium may cause a programmable processor, or other processor, to perform one or more operations of a method, e.g., when the instructions are executed. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples of the disclosure have been described. These and other examples are within the scope of the following claims.

The invention claimed is:

1. A method comprising:
exchanging, by a first routing device and with a second routing device, a plurality of targeted hello messages using a Protocol Independent Multicast (PIM) protocol to establish a targeted neighbor connection between the first routing device and the second routing device, wherein the first routing device comprises a rendezvous point that exchanges the plurality of targeted hello messages with the second routing device via at least one intermediate routing device, wherein the second routing device comprises a first hop router communicatively coupled to at least one source device that provides at least one multicast stream, and wherein exchanging the plurality of targeted hello messages comprises:

receiving, by the first routing device and from the second routing device, a first targeted hello message comprising a first unicast message that is addressed to the first routing device; and sending, by the first routing device and to the second routing device, a second targeted hello message to acknowledge receipt of the first targeted hello message, wherein the second targeted hello message comprises a second unicast message that is addressed to the second routing device; and receiving, by the first routing device and from the second routing device using the targeted neighbor connection, a register message that includes a plurality of multicast stream data elements, wherein each multicast stream data element identifies a source address and a group address that are collectively associated with a respective multicast stream, and wherein each multicast stream data element further indicates whether the respective multicast stream is active or withdrawn.

2. The method of claim 1, wherein the targeted neighbor connection comprises a reliable transport connection, wherein a source address of the second targeted hello message comprises a primary address of the first routing device, wherein a secondary address of the second targeted hello message comprises an anycast address of the first routing device, and wherein the register message is addressed to the primary address of the first routing device.

3. The method of claim 2, wherein the first routing device comprises a first rendezvous point having the anycast address, wherein the plurality of targeted hello messages comprises a first plurality of targeted hello messages, the method further comprising:

exchanging, by the first routing device and with a third routing device comprising a second rendezvous point that has RP having the same anycast address as the first routing device, a second plurality of hello messages to establish a targeted neighbor connection between the first routing device and the third routing device; and sending, from the first routing device and to the third routing device, the register message received from the second routing device, wherein the third routing device does not retransmit the register message received from the first routing device.

4. The method of claim 1, further comprising:

updating, by the first routing device and based on the register message, state information for multicast streams that are active at the second routing device and serviced by the first routing device, wherein the state information identifies a respective source address and group address for each active multicast stream.

5. The method of claim 4, wherein updating the state information comprises:

for each multicast stream that is indicated as active in the plurality of multicast stream data elements of the register message, adding the respective source address and group address to the state information; and for each multicast stream that is indicated as withdrawn in the plurality of multicast stream data elements of the register message, removing the respective source address and group address from the state information.

6. The method of claim 4, wherein receiving the register message comprises receiving a first register message that includes a first plurality of multicast stream data elements, wherein one of the first plurality of multicast stream data elements identifies a particular source address and a particular group address that are collectively associated with a particular multicast stream, the one of the first plurality of multicast stream data elements further indicating that the particular multicast stream is active at the second routing device, and wherein updating the state information comprises adding, to the state information, an entry identifying the particular source address and the particular group address that are collectively associated with the particular multicast stream, the entry indicating that the particular multicast stream is active at the second routing device.

7. The method of claim 6, further comprising:

after receiving the first register message, receiving, by the first routing device and from the second routing device using the targeted neighbor connection, a second register message that includes a second plurality of multicast stream data elements, wherein one of the second plurality of multicast stream data elements identifies the particular source address and the particular group address collectively associated with the particular multicast stream, the one of the second plurality of multicast stream data elements further indicating that the particular multicast stream is now withdrawn at the second routing device; and removing, from the state information, the entry identifying the particular source address and the particular group address for the particular multicast stream.

8. The method of claim 1, wherein exchanging the plurality of targeted hello messages comprises discovering one or more capabilities or features of the second routing device.

9. A first routing device, comprising:

a non-transitory computer-readable storage medium; and at least one processor coupled to the non-transitory computer-readable medium, the at least one processor being configured to:

exchange, with a second routing device, a plurality of targeted hello messages using a Protocol Independent Multicast (PIM) protocol to establish a targeted neighbor connection between the first routing device and the second routing device, wherein the first routing device comprises a rendezvous point that exchanges the plurality of targeted hello messages with the second routing device via at least one intermediate routing device, wherein the second routing device comprises a first hop router communicatively coupled to at least one source device that provides at least one multicast stream, and wherein the at least one processor is configured to exchange the plurality of targeted hello messages at least by being configured to:

receive, from the second routing device, a first targeted hello message comprising a first unicast message that is addressed to the first routing device; and send, to the second routing device, a second targeted hello message to acknowledge receipt of the first targeted hello message, wherein the second targeted hello message comprises a second unicast message that is addressed to the second routing device; and receive, from the second routing device using the targeted neighbor connection, a register message that includes a plurality of multicast stream data elements, wherein each multicast stream data element identifies a source address and a group address that are collectively associated with a respective multicast stream, and wherein each multicast stream data element further indicates whether the respective multicast stream is active or withdrawn.

10. The first routing device of claim 9, wherein the targeted neighbor connection comprises a reliable transport connection, wherein a source address of the second targeted hello message comprises a primary address of the first routing device wherein a secondary address of the second targeted hello message comprises an anycast address of the first routing device, and wherein the register message is addressed to the primary address of the first routing device.

11. The first routing device of claim 10, wherein the first routing device comprises a first rendezvous point having the anycast address, wherein the plurality of targeted hello messages comprises a first plurality of targeted hello messages, and wherein the at least one processor is further configured to:

exchange, with a third routing device comprising a second rendezvous point that has the same anycast address as the first routing device, a second plurality of hello messages to establish a targeted neighbor connection between the first routing device and the third routing device; and send, to the third routing device, the register message received from the second routing device, wherein the third routing device does not retransmit the register message received from the first routing device.

12. The first routing device of claim 9, wherein the at least one processor is further configured to:

update, based on the register message, state information for multicast streams that are active at the second routing device and serviced by the first routing device, wherein the state information identifies a respective source address and group address for each active multicast stream.

13. The first routing device of claim 12, wherein the at least one processor is configured to update the state information at least by:

for each multicast stream that is indicated as active in the plurality of multicast stream data elements of the register message, adding the respective source address and group address to the state information; and for each multicast stream that is indicated as withdrawn in the plurality of multicast stream data elements of the register message, removing the respective source address and group address from the state information.

14. The first routing device of claim 12, wherein the at least one processor is configured to receive the register message at least by receiving a first register message that includes a first plurality of multicast stream data elements, wherein one of the first plurality of multicast stream data elements identifies a particular source address and a particular group address that are collectively associated with a particular multicast stream, the one of the first plurality of multicast stream data elements further indicating that the particular multicast stream is active at the second routing device, and wherein the at least one processor is configured to update the state information at least by adding, to the state information, an entry identifying the particular source address and the particular group address that are collectively associated with the particular multicast stream, the entry indicating that the particular multicast stream is active at the second routing device.

15. The first routing device of claim 14, wherein the at least one processor is further configured to:

after receiving the first register message, receive, from the second routing device using the targeted neighbor connection, a second register message that includes a second plurality of multicast stream data elements, wherein one of the second plurality of multicast stream data elements identifies the particular source address and the particular group address collectively associated with the particular multicast stream, the one of the second plurality of multicast stream data elements further indicating that the particular multicast stream is now withdrawn at the second routing device; and remove, from the state information, the entry identifying the particular source address and the particular group address for the particular multicast stream.

16. The first routing device of claim 9, wherein the at least one processor is configured to exchange the plurality of targeted hello messages at least by discovering one or more capabilities or features of the second routing device.

17. A non-transitory computer-readable storage medium comprising instructions that, when executed, cause at least one processor of a first routing device to perform operations comprising:

exchanging, with a second routing device, a plurality of targeted hello messages using a Protocol Independent Multicast (PIM) protocol to establish a targeted neighbor connection between the first routing device and the second routing device, wherein the first routing device comprises a rendezvous point that exchanges the plurality of targeted hello messages with the second routing device via at least one intermediate routing device, wherein the second routing device comprises a first hop router communicatively coupled to at least one source device that provides at least one multicast stream, and wherein exchanging the plurality of targeted hello messages comprises:

receiving, from the second routing device, a first targeted hello message comprising a first unicast message that is addressed to the first routing device; and sending, to the second routing device, a second targeted hello message to acknowledge receipt of the first targeted hello message, wherein the second targeted hello message comprises a second unicast message that is addressed to the second routing device; and receiving, from the second routing device using the targeted neighbor connection, a register message that includes a plurality of multicast stream data elements, wherein each multicast stream data element identifies a source address and a group address that are collectively associated with a respective multicast stream, and wherein each multicast stream data element further indicates whether the respective multicast stream is active or withdrawn.

18. The non-transitory computer-readable storage medium of claim 17,
wherein the targeted neighbor connection comprises a reliable transport connection,
wherein a source address of the second targeted hello message comprises a primary address of the first routing device,
wherein a secondary address of the second targeted hello message comprises an anycast address of the first routing device, and
wherein the register message is addressed to the primary address of the first routing device.

19. The non-transitory computer-readable storage medium of claim 18, wherein the first routing device comprises a first rendezvous point having the anycast address, wherein the plurality of targeted hello messages comprises a first plurality of targeted hello messages, and wherein the operations further comprise:
exchanging, with a third routing device comprising a second rendezvous point that has the same anycast address as the first routing device, a second plurality of hello messages to establish a targeted neighbor connection between the first routing device and the third routing device; and
sending, to the third routing device, the register message received from the second routing device, wherein the third routing device does not retransmit the register message received from the first routing device.

20. The non-transitory computer-readable storage medium of claim 17, wherein the operations further comprise:
updating, based on the register message, state information for multicast streams that are active at the second routing device and serviced by the first routing device, wherein the state information identifies a respective source address and group address for each active multicast stream.

21. The non-transitory computer-readable storage medium of claim 20, wherein updating the state information comprises:
for each multicast stream that is indicated as active in the plurality of multicast stream data elements of the register message, adding the respective source address and group address to the state information; and
for each multicast stream that is indicated as withdrawn in the plurality of multicast stream data elements of the register message, removing the respective source address and group address from the state information.

22. The non-transitory computer-readable storage medium of claim 20,
wherein receiving the register message comprises receiving a first register message that includes a first plurality of multicast stream data elements,
wherein one of the first plurality of multicast stream data elements identifies a particular source address and a particular group address that are collectively associated with a particular multicast stream, the one of the first plurality of multicast stream data elements further indicating that the particular multicast stream is active at the second routing device, and
wherein updating the state information comprises adding, to the state information, an entry identifying the particular source address and the particular group address that are collectively associated with the particular multicast stream, the entry indicating that the particular multicast stream is active at the second routing device.

23. The non-transitory computer-readable storage medium of claim 22, wherein the operations further comprise:
after receiving the first register message, receiving, from the second routing device using the targeted neighbor connection, a second register message that includes a second plurality of multicast stream data elements, wherein one of the second plurality of multicast stream data elements identifies the particular source address and the particular group address collectively associated with the particular multicast stream, the one of the second plurality of multicast stream data elements further indicating that the particular multicast stream is now withdrawn at the second routing device; and
removing, from the state information, the entry identifying the particular source address and the particular group address for the particular multicast stream.

24. The non-transitory computer-readable storage medium of claim 17, wherein exchanging the plurality of targeted hello messages comprises discovering one or more capabilities or features of the second routing device.

25. A method comprising:
exchanging, by a first routing device and with a second routing device, a plurality of targeted hello messages using a Protocol Independent Multicast (PIM) protocol to establish a targeted neighbor connection between the first routing device and the second routing device, wherein the first routing device comprises a first hop router communicatively coupled to at least one source device that provides at least one multicast stream, wherein the second routing device comprises a rendezvous point, wherein the first routing device exchanges the plurality of targeted hello messages with the second routing device via at least one intermediate routing device, and wherein exchanging the plurality of targeted hello messages comprises:
sending, by the first routing device and to the second routing device, a first targeted hello message comprising a first unicast message that is addressed to the second routing device; and
receiving, by the first routing device and from the second routing device, a second targeted hello message to acknowledge receipt of the first targeted hello message, wherein the second targeted hello message comprises a second unicast message that is addressed to the first routing device; and
sending, by the first routing device and to the second routing device using the targeted neighbor connection, a register message that includes a plurality of multicast stream data elements, wherein each multicast stream data element identifies a source address and a group address that are collectively associated with a respective multicast stream, and wherein each multicast stream data element further indicates whether the respective multicast stream is active or withdrawn.

26. The method of claim 25,
wherein the targeted neighbor connection comprises a reliable transport connection,
wherein a source address of the second targeted hello message comprises a primary address of the second routing device,
wherein a secondary address of the second targeted hello message comprises an anycast address of the second routing device, and wherein the register message is addressed to the primary address of the second routing device.

27. The method of claim 26, wherein sending the first targeted hello message comprises sending, by the first routing device, the first targeted hello message to the anycast address of the second routing device.

28. The method of claim 27, wherein the second routing device comprises a first rendezvous point having the anycast address, wherein the plurality of targeted hello messages comprises a first plurality of targeted hello messages, and wherein the method further comprises:
 determining, by the first routing device, that the targeted neighbor connection with the second routing device has failed; and
 exchanging, by the first routing device and with a third routing device comprising a second rendezvous point that has the same anycast address as the second routing device first RP, a second plurality of targeted hello messages to establish a targeted neighbor connection between the first routing device and the third routing device.

29. A first routing device, comprising:
 a non-transitory computer-readable storage medium; and
 at least one processor coupled to the non-transitory computer-readable medium, the at least one processor being configured to:
  exchange, with a second routing device, a plurality of targeted hello messages using a Protocol Independent Multicast (PIM) protocol to establish a targeted neighbor connection between the first routing device and the second routing device, wherein the first routing device comprises a first hop router communicatively coupled to at least one source device that provides at least one multicast stream, wherein the second routing device comprises a rendezvous point, wherein the first routing device exchanges the plurality of targeted hello messages with the second routing device via at least one intermediate routing device, and wherein the at least one processor is configured to exchange the plurality of targeted hello messages at least by being configured to:
   send, to the second routing device, a first targeted hello message comprising a first unicast message that is addressed to the second routing device; and
   receive, from the second routing device, a second targeted hello message to acknowledge receipt of the first targeted hello message, wherein the second targeted hello message comprises a second unicast message that is addressed to the first routing device; and
  send, to the second routing device using the targeted neighbor connection, a register message that includes a plurality of multicast stream data elements, wherein each multicast stream data element identifies a source address and a group address that are collectively associated with a respective multicast stream, and wherein each multicast stream data element further indicates whether the respective multicast stream is active or withdrawn.

30. The first routing device of claim 29,
 wherein the targeted neighbor connection comprises a reliable transport connection,
 wherein a source address of the second targeted hello message comprises a primary address of the second routing device,
 wherein a secondary address of the second targeted hello message comprises an anycast address of the second routing device, and
 wherein the register message is addressed to the primary address of the second routing device.

31. The first routing device of claim 30, wherein the at least one processor is configured to send the first targeted hello message at least by sending the first targeted hello message to the anycast address of the second routing device.

32. The first routing device of claim 31, wherein the second routing device comprises a first rendezvous point having the anycast address, wherein the plurality of targeted hello messages comprises a first plurality of targeted hello messages, and wherein the at least one processor is further configured to:
 determine that the targeted neighbor connection with the second routing device has failed; and
 exchange, with a third routing device comprising a second rendezvous point that has the same anycast address as the second routing device, a second plurality of targeted hello messages to establish a targeted neighbor connection between the first routing device and the third routing device.

* * * * *

UNITED STATES PATENT AND TRADEMARK OFFICE
CERTIFICATE OF CORRECTION

PATENT NO. : 9,660,898 B2
APPLICATION NO. : 14/576830
DATED : May 23, 2017
INVENTOR(S) : Anish Peter et al.

Page 1 of 1

It is certified that error appears in the above-identified patent and that said Letters Patent is hereby corrected as shown below:

In the Claims

Column 23, Line 48 (Claim 3): Replace "that has RP having the same anycast address" with --that has the same anycast address--

Column 29, Line 19 (Claim 28): Replace "device first RP, a second plurality" with --device, a second plurality--

Signed and Sealed this
Twenty-eighth Day of May, 2019

Andrei Iancu
*Director of the United States Patent and Trademark Office*